United States Patent
Yoda et al.

(10) Patent No.: US 12,092,514 B2
(45) Date of Patent: Sep. 17, 2024

(54) OPTICAL FIBER SENSING SYSTEM, OPTICAL FIBER SENSING DEVICE, AND METHOD FOR DETECTING PIPE DETERIORATION

(71) Applicant: NEC Corporation, Tokyo (JP)

(72) Inventors: Yukihide Yoda, Tokyo (JP); Naoto Ogura, Tokyo (JP); Yoshiaki Aono, Tokyo (JP)

(73) Assignee: NEC CORPORATION, Tokyo (JP)

( * ) Notice: Subject to any disclaimer, the term of this patent is extended or adjusted under 35 U.S.C. 154(b) by 354 days.

(21) Appl. No.: 17/626,209

(22) PCT Filed: Jul. 15, 2020

(86) PCT No.: PCT/JP2020/027424
§ 371 (c)(1),
(2) Date: Jan. 11, 2022

(87) PCT Pub. No.: WO2021/010407
PCT Pub. Date: Jan. 21, 2021

(65) Prior Publication Data
US 2022/0244097 A1    Aug. 4, 2022

(30) Foreign Application Priority Data
Jul. 16, 2019   (JP) .................... 2019-131495

(51) Int. Cl.
*G01H 9/00*       (2006.01)
*F17D 5/06*       (2006.01)
(Continued)

(52) U.S. Cl.
CPC ............ *G01H 9/004* (2013.01); *F17D 5/06* (2013.01); *G01D 5/35358* (2013.01); *G01N 29/069* (2013.01); *G01N 29/043* (2013.01)

(58) Field of Classification Search
CPC ...... G01H 9/004; F17D 5/06; G01D 5/35358; G01N 29/069; G01N 29/043; F16L 57/96
(Continued)

(56) References Cited

U.S. PATENT DOCUMENTS 5,026,141 A * 6/1991 Griffiths ............... G01M 11/086
385/13
7,564,540 B2 * 7/2009 Paulson ............... G01M 11/083
356/477
(Continued)

FOREIGN PATENT DOCUMENTS

| CN | 105841793 A | 8/2016 |
| CN | 109027704 A | 12/2018 |

(Continued)

OTHER PUBLICATIONS

Indian Office Action for IN Application No. 202217002381 mailed on Jul. 1, 2022.
(Continued)

*Primary Examiner* — Jacques M Saint Surin

(57) ABSTRACT

An optical fiber sensing system according to the present disclosure comprises: an optical fiber (10) that is laid in a pipe (30); a reception unit (21) configured to receive, from the optical fiber (10), an optical signal superimposed with vibration detected by the optical fiber (10); and an assessment unit (22) configured to extract a vibration pattern of the vibration detected by the optical fiber (10) from the optical signal and determine the degradation state of the pipe (30) based on the extracted vibration pattern.

16 Claims, 29 Drawing Sheets

(51) Int. Cl.
  *G01D 5/353* (2006.01)
  *G01N 29/04* (2006.01)
  *G01N 29/06* (2006.01)

(58) Field of Classification Search
  USPC .......................................................... 73/587
  See application file for complete search history.

(56) References Cited

U.S. PATENT DOCUMENTS

| | | | |
|---|---|---|---|
| 7,617,873 B2 * | 11/2009 | Lovell ................... | E21B 47/135 |
| | | | 166/305.1 |
| 8,131,121 B2 * | 3/2012 | Huffman ............. | G01M 5/0041 |
| | | | 356/73.1 |
| 2011/0205532 A1 | 8/2011 | Mori et al. | |
| 2015/0177195 A1 | 6/2015 | Sasaki et al. | |
| 2018/0348080 A1 | 12/2018 | Inoue et al. | |

FOREIGN PATENT DOCUMENTS

| | | |
|---|---|---|
| CN | 109374110 A | 2/2019 |
| CN | 109974835 A | 7/2019 |
| GB | 2539254 | 12/2016 |
| JP | H10-207534 A | 8/1998 |
| JP | 2004-309259 A1 | 11/2004 |
| JP | 2007-010646 A | 1/2007 |
| JP | 2007-121155 A | 5/2007 |
| JP | 2010-054349 A | 3/2010 |
| JP | 2010-107362 A | 5/2010 |
| JP | 2010-139248 A | 6/2010 |
| JP | 2011-174765 A | 9/2011 |
| JP | 2011-203116 A | 10/2011 |
| JP | 2013-044612 A | 3/2013 |
| JP | 2014-190753 A | 10/2014 |
| JP | 2017-142153 A | 8/2017 |
| JP | 2017-523427 A | 8/2017 |
| JP | 2018-077120 A | 5/2018 |
| KR | 101883359 * | 8/2018 ........... G01R 31/083 |
| WO | 2011/103290 A2 | 8/2011 |
| WO | 2012/127639 A1 | 9/2012 |
| WO | 2013/183313 A1 | 12/2013 |
| WO | 2017/094846 A1 | 6/2017 |
| WO | 2019/022084 A1 | 1/2019 |

OTHER PUBLICATIONS

CN Office Action for Chinese Patent Application No. 202080051026. 2, mailed on Oct. 21, 2023 with English Translation.
Extended European Search Report for EP Application No. EP20839993.1 dated on Jul. 15, 2022.
International Search Report for PCT Application No. PCT/JP2020/027424, mailed on Sep. 8, 2020.
JP Office Action for JP Application No. 2021-533083, mailed on Sep. 26, 2023 with English Translation.
Japanese Office Action for JP Application No. 2021-533083 mailed on Dec. 27, 2022 with English Translation.

* cited by examiner

| TYPE OF VIBRATION PATTERN | DEGRADATION STATE OF PIPE |
|---|---|
| VIBRATION PATTERN A | DEGRADATION DEGREE 0 (NORMAL) |
| VIBRATION PATTERN B | DEGRADATION DEGREE 1 |
| VIBRATION PATTERN C | DEGRADATION DEGREE 2 |

Fig. 6

| DEGRADATION STATE OF PIPE | BREAKAGE TIME |
|---|---|
| DEGRADATION DEGREE 0 (NORMAL) | NO SIGN |
| DEGRADATION DEGREE 1 | NO SIGN |
| DEGRADATION DEGREE 2 | SIGN (IN TWO YEARS) |
| DEGRADATION DEGREE 3 | SIGN (IN ONE YEAR) |
| ... | ... |

Fig. 17

| DISTANCE FROM OPTICAL FIBER SENSING EQUIPMENT | PILLAR IDENTIFICATION INFORMATION |
|---|---|
| xx[m] | PILLAR 31A |
| yy[m] | PILLAR 31B |
| zz[m] | PILLAR 31C |

Fig. 21

OPTICAL FIBER SENSING SYSTEM, OPTICAL FIBER SENSING DEVICE, AND METHOD FOR DETECTING PIPE DETERIORATION

This application is a National Stage Entry of PCT/JP2020/027424 filed on Jul. 15, 2020, which claims priority from Japanese Patent Application 2019-131495 filed on Jul. 16, 2019, the contents of all of which are incorporated herein by reference, in their entirety.

TECHNICAL FIELD

The present disclosure relates to an optical fiber sensing system, optical fiber sensing equipment, and a method for detecting pipe degradation.

BACKGROUND ART

Conventionally, inspection work of pipes that are laid in plants and the like have been often manually carried out by skilled workers. However, this type of inspection work required skilled workers to be dispatched to the pipes for each inspection, which was costly. In addition, the setting needed to be prepared for the workers to perform the inspection work. Preparation of the setting, for example, requires scaffolding when the pipes are located above ground, or excavation when the pipes are located underground. Preparing such a setting was not only costly but also time-consuming.

For this reason, a technique has recently been proposed for detecting the condition of pipes without the need for workers. For example, Patent Literature 1 discloses a technique, in high-temperature gas piping consisting of an internal pipe through which high-temperature fluid flows, an insulation layer covering the internal piping, and an external pipe covering the insulation layer, for detecting abnormal condition caused by breakage of the insulation material based on measured temperature distribution data on the surface of the external pipe by measuring temperatures at multiple locations on the surface of the external pipe.

CITATION LIST

Patent Literature

Patent Literature 1: Japanese Unexamined Patent Application Publication No. H10-207534

SUMMARY OF INVENTION

Technical Problem

However, the technique disclosed in Patent Literature 1 detects abnormal condition using the temperature distribution on the surface of the external pipe that covers an insulation material, so the technique can only be applied when a substance flowing through the pipe is high temperature and the pipe uses an insulation material.

In other words, the technique disclosed in Patent Literature 1 cannot be applied when a substance flowing through the pipe is not high temperature or when the pipe does not use an insulation material.

Therefore, an objective of the present disclosure is to solve the above-mentioned problem and to provide an optical fiber sensing system, optical fiber sensing equipment, and a method for detecting pipe degradation that can detect the condition of a pipe regardless of the substance flowing through the pipe or the structure of the pipe.

Solution to Problem

The optical fiber sensing system according to an aspect comprises: an optical fiber that is laid in a pipe; a reception unit configured to receive, from the optical fiber, an optical signal superimposed with vibration detected by the optical fiber; and an assessment unit configured to extract a vibration pattern of the vibration detected by the optical fiber from the optical signal and determine a degradation state of the pipe based on the extracted vibration pattern.

The optical fiber sensing equipment according to an aspect comprises: a reception unit configured to receive, from an optical fiber that is laid in a pipe, an optical signal superimposed with vibration detected by the optical fiber; and an assessment unit configured to extract a vibration pattern of the vibration detected by the optical fiber from the optical signal and determine a degradation state of the pipe based on the extracted vibration pattern.

The method for detecting pipe degradation according to an aspect includes: a step for detecting vibration by an optical fiber that is laid in a pipe; a receiving step for receiving, from the optical fiber, an optical signal superimposed with the vibration detected by the optical fiber; and an assessment step for extracting a vibration pattern of the vibration detected by the optical fiber from the optical signal and determining a degradation state of the pipe based on the extracted vibration pattern.

Advantageous Effects of Invention

The above-mentioned aspects offer the effect of providing an optical fiber sensing system, optical fiber sensing equipment, and a method for detecting pipe degradation that can detect the condition of pipe regardless of the substance flowing through the pipe or the structure of the pipe.

BRIEF DESCRIPTION OF DRAWINGS

FIG. 6 is a diagram illustrating an example of training data used for machine learning executed by the assessment unit according to the first example embodiment;

FIG. 17 is a diagram illustrating an example of a correspondence table stored by an assessment unit according to a second example embodiment;

FIG. 21 is a diagram illustrating an example of a correspondence table stored by an assessment unit according to a third example embodiment;

DESCRIPTION OF EMBODIMENTS

Figure 1:
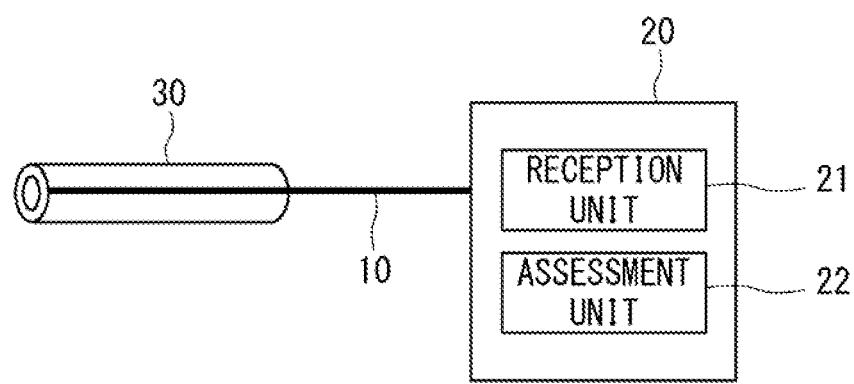
FIG. 1 is a diagram illustrating a configuration example of an optical fiber sensing system according to a first example embodiment.

The following will describe example embodiments of the present disclosure with reference to the drawings. Note that the following descriptions and drawings have been abbreviated and simplified as appropriate for clarity of explanation. Further, in each of the following drawings, the same elements are designated by the same reference numerals, and duplicate explanations are omitted where necessary.

First Embodiment

First, the following will describe a configuration example of an optical fiber sensing system according to a first example embodiment with reference to FIG. 1.

As illustrated in FIG. 1, the optical fiber sensing system according to the first example embodiment comprises an optical fiber 10 and optical fiber sensing equipment 20. Further, the optical fiber sensing equipment 20 comprises a reception unit 21 and an assessment unit 22.

The optical fiber 10 is laid in a pipe 30, and one end thereof is connected to the optical fiber sensing equipment 20. Although FIG. 1 illustrates an example in which the optical fiber 10 is passed through the inside of the pipe 30, the method of laying the optical fiber 10 is not limited thereto. For example, the optical fiber 10 may be wound around the pipe 30, or may crawl inside or outside the pipe 30 along the pipe 30. Alternatively, a sheet in which the optical fiber 10 is woven may be wound around the pipe 30. The optical fiber 10 may also be housed, together with other cables, in a box located inside or outside the pipe 30 along the pipe 30.

Figure 2:
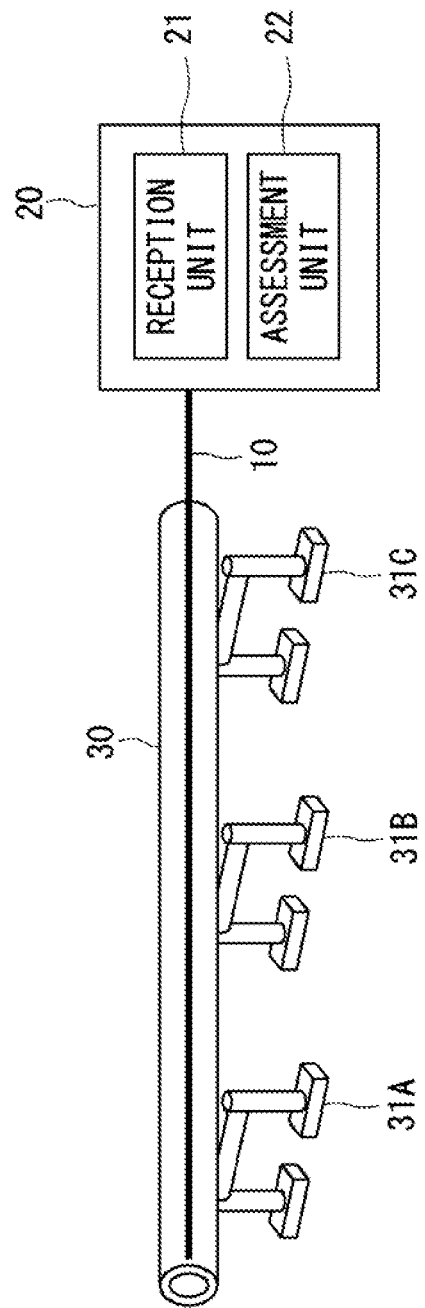
FIG. 2 is a diagram illustrating another configuration example of the optical fiber sensing system according to the first example embodiment.
Figure 3:
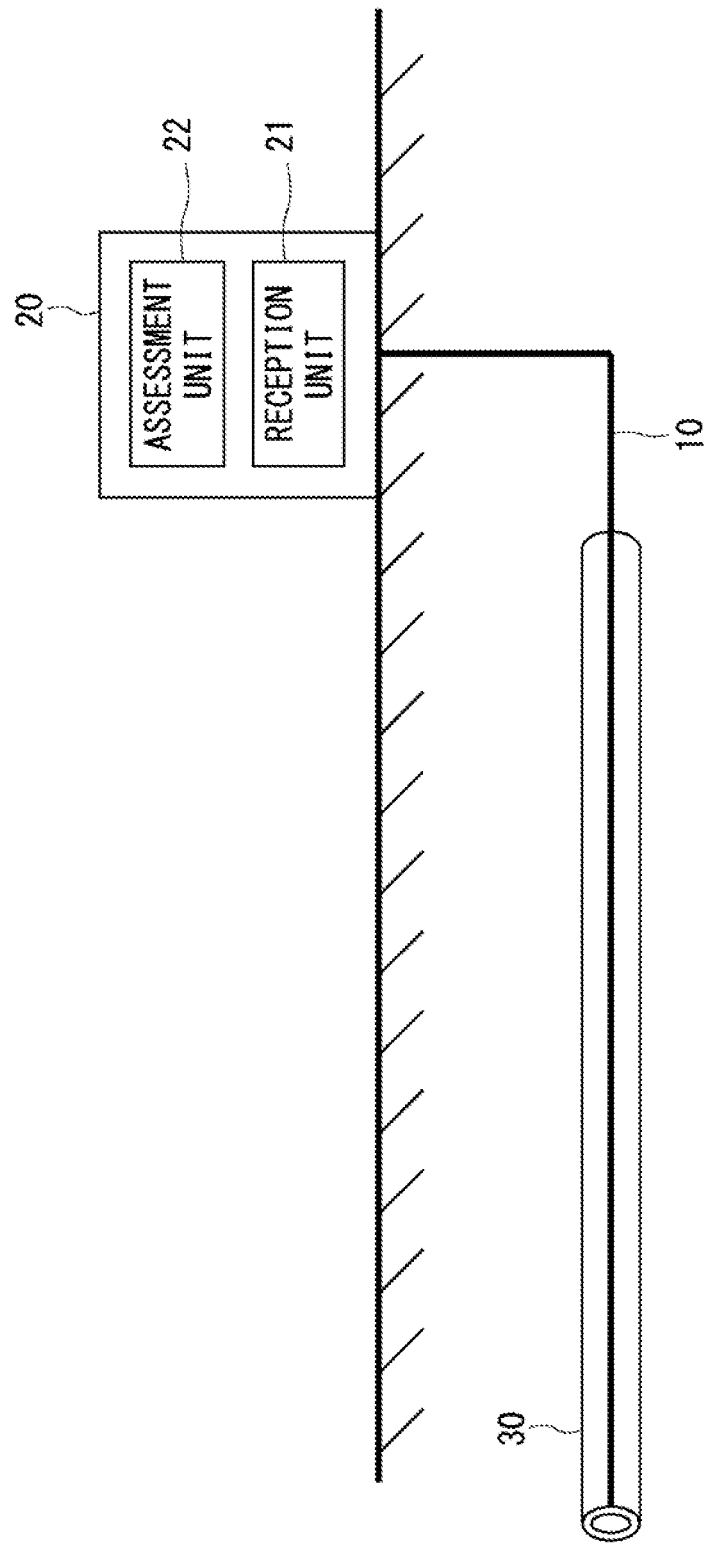
FIG. 3 is a diagram illustrating another configuration example of the optical fiber sensing system according to the first example embodiment.

The pipe 30 can be laid at any location, such as above ground, underground, and in/on a ceiling, a floor, and a wall. FIG. 2 illustrates an example of laying the pipe 30 above ground. In the example of FIG. 2, the pipe 30 is supported by pillars 31A to 31C (hereinafter, referred to as the pillar 31 when any pillars 31A to 31C are not specified) and is laid above ground. FIG. 3 illustrates an example of laying the pipe 30 underground.

More specifically, examples of the 30 pipe include a pipe for cables and sewage that is laid underground, an air conditioning pipe that is laid in a ceiling, and a pipe for high temperature fluids that is used in plants, although applications of the pipe 30 are not limited thereto.

Figure 4:
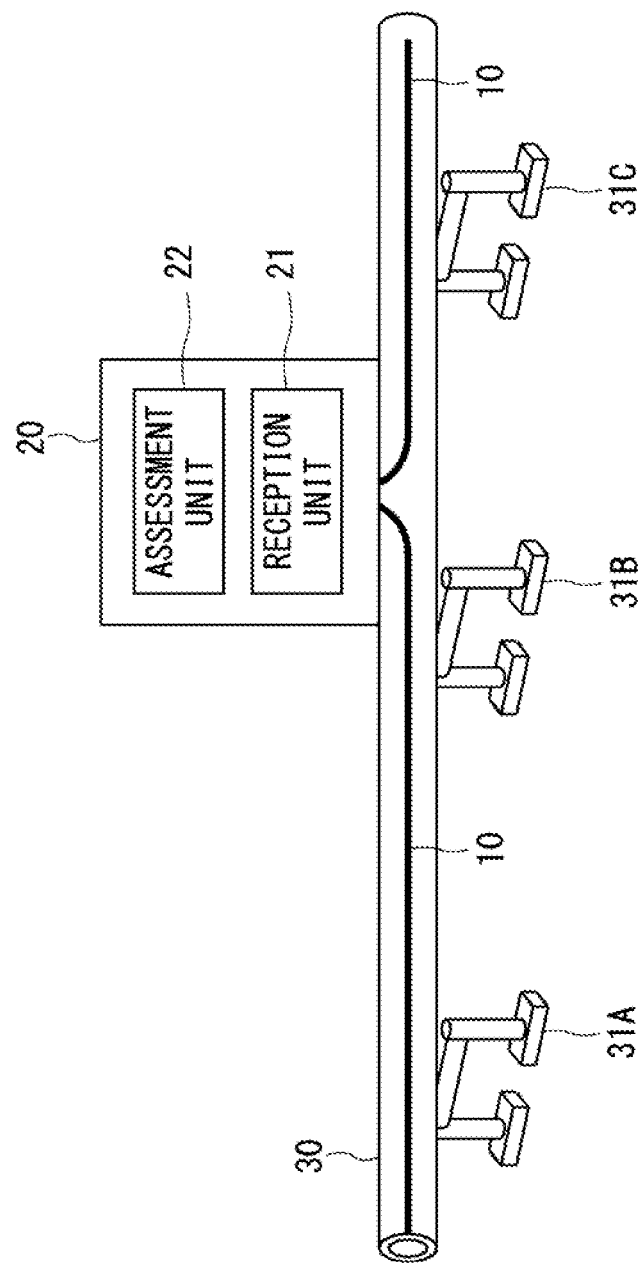
FIG. 4 is a diagram illustrating another configuration example of the optical fiber sensing system according to the first example embodiment.

The number of optical fibers 10 is not limited to one, and a plurality of optical fibers 10 may be provided. FIG. 4 illustrates an example of laying two optical fibers 10 in the pipe 30. In the example of FIG. 4, one end of each of the two optical fibers 10 is connected to the optical fiber sensing equipment 20, and the two optical fibers 10 extend in opposite directions to each other.

The reception unit 21 injects pulsed light into the optical fiber 10. The reception unit 21 also receives the reflected or scattered light that is generated as the pulsed light is transmitted through the optical fiber 10 as return light (an optical signal) via the optical fiber 10.

When vibration occurs in the pipe 30, the vibration is transmitted to the optical fiber 10 laid in the pipe 30 and is superimposed on the return light transmitted by the optical fiber 10. In this way, the optical fiber 10 can detect vibration generated in the pipe 30.

Therefore, when vibration occurs in the pipe 30, the optical fiber 10 detects the vibration and transmits the vibration superimposed on the return light, and the reception unit 21 receives the return light on which the vibration detected by the optical fiber 10 is superimposed.

Here, the vibration occurring in the pipe 30 has a unique vibration pattern in which the strength of the vibration, the location of the vibration, the transition of the fluctuation of the frequency, and the like differ depending on the degradation state of the pipe 30. It is, therefore, possible to determine the degradation state of the pipe 30 by analyzing a dynamic change in the vibration pattern of vibration occurring in the pipe 30.

Thus, the assessment unit 22 extracts the vibration pattern of vibration detected by the optical fiber 10 from the return light that was received by the reception unit 21 from the optical fiber 10 and determines the degradation state of the pipe 30 based on the extracted vibration pattern. In other words, the assessment unit 22 determines how much the pipe 30 has degraded.

Note that breakage of the pipe 30 herein means a state in which leakage of a substance flowing through the pipe 30 occurs (for example, a crack or the like), and degradation of the pipe 30 means a state on the way to breakage (for example, corrosion, wear or the like).

The following will describe examples of how the assessment unit 22 determines the degradation state of the pipe 30, based on the vibration pattern of vibration detected by the optical fiber 10.

(A1) Method A1

First, method A1 will be described.

In method A, the assessment unit 22 uses pattern matching.

For example, the assessment unit 22 stores in advance a matching pattern for each degradation degree of the pipe 30, which is a vibration pattern when vibration occurs in the pipe 30 having the degradation degree. The assessment unit 22 compares a vibration pattern detected by the optical fiber 10 with the matching patterns stored in advance. When the vibration pattern detected by the optical fiber 10 matches any of the matching patterns stored in advance, the assessment unit 22 determines that the pipe 30 has the degradation degree corresponding to the matched matching pattern.

Further, the assessment unit 22 may change the matching patterns according to the environment in which the pipe 30 is laid and the substance flowing through the pipe 30.

For example, when the pipe 30 is laid outdoors, the assessment unit 22 may use vibration patterns of vibration generated by wind or rain as matching patterns, vibration patterns of vibration generated by trains or cars traveling on surrounding roads, or vibration patterns of vibration generated by vibration of frequent construction works.

Further, the substance flowing through the pipe 30 is roughly classified into liquid, gas, or solid. As such, the assessment unit 22 may change the matching patterns depending on whether the substance flowing through the pipe 30 is liquid, gas, or solid.

(A2) Method A2

Next, method A2 will be described.

In method A2, the assessment unit 22 machine-learns (for example, by deep learning) vibration patterns according to the degradation states of the pipe 30, and uses the learning result of the machine learning (initial training model) to determine the degradation state of the pipe 30.

Figure 5:
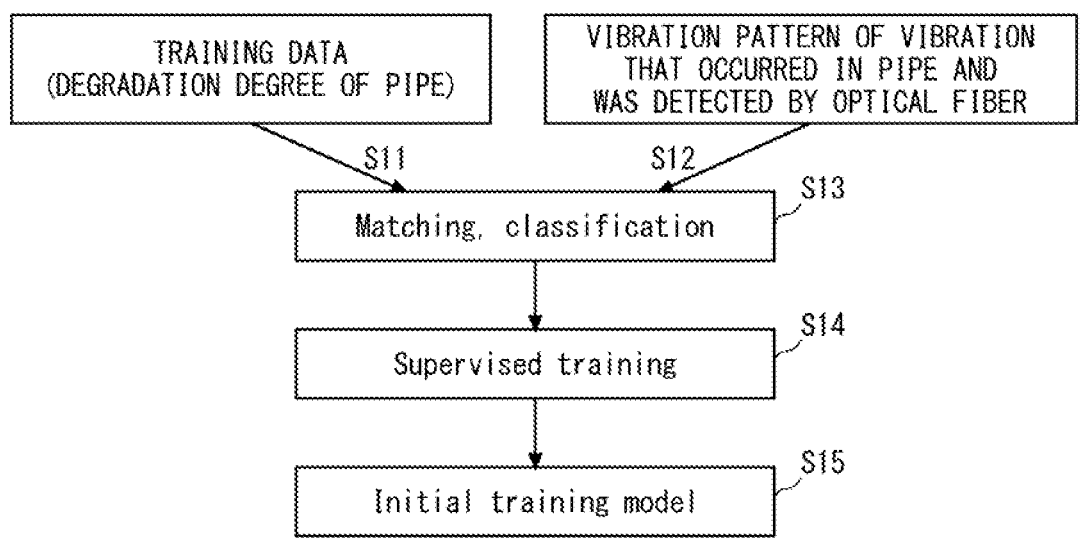
FIG. 5 is a flowchart illustrating an example of machine learning executed by an assessment unit according to the first example embodiment.

The machine learning method of method A2 will be described below with reference to FIG. 5. As illustrated in FIG. 5, the assessment unit 22 inputs: training data indicating a degradation degree of the pipe 30; and a vibration pattern of vibration that occurred in the pipe 30 of the degradation degree and was detected by the optical fiber 10 (steps S11, S12). FIG. 6 illustrates an example of training data. FIG. 6 is an example of training data when three vibration patterns A, B, and C are used for training. Note that, in FIG. 6, the normal pipe 30 has the degradation degree of 0, where the larger the value of the degradation degree, the more the degradation has progressed (the same applies to FIGS. 17 and 18 below).

Subsequently, the assessment unit 22 performs matching and classification of the training data and the vibration pattern (step S13), and performs supervised learning (step S14). As the result, an initial training model is obtained (step S15). This initial training model is a model in which a degradation degree of the pipe 30 is output when a vibration pattern of vibration detected by the optical fiber 10 is input.

When determining the degradation state of the pipe 30, the assessment unit 22 inputs the vibration pattern of vibration detected by the optical fiber 10 into the initial training model. In this way, the assessment unit 22 obtains the degradation degree of the pipe 30 as an output result of the initial training model.

Further, the assessment unit 22 may change the initial training model according to the environment in which the pipe 30 is laid and the substance flowing through the pipe 30. Examples of the environment in which the pipe 30 is laid and the substance flowing through the pipe 30 are as described with method A1 above.

(A3) Method A3

Next, method A3 will be described.

Figure 7:
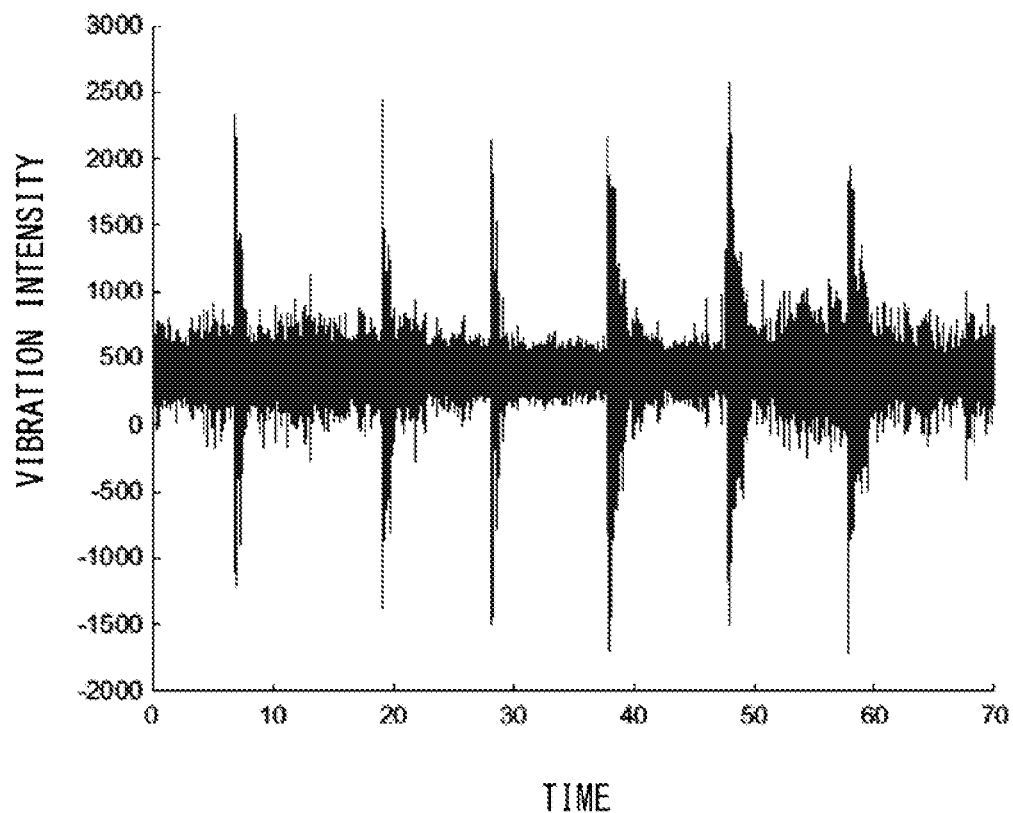
FIG. 7 is a diagram illustrating an example of a vibration pattern extracted by the assessment unit according to the first example embodiment.

FIG. 7 illustrates a vibration pattern of vibration detected at a certain location on the optical fiber 10 when artificial vibration is generated in the pipe 30, where the horizontal axis indicates time and the vertical axis indicates vibration intensity.

Figure 8:
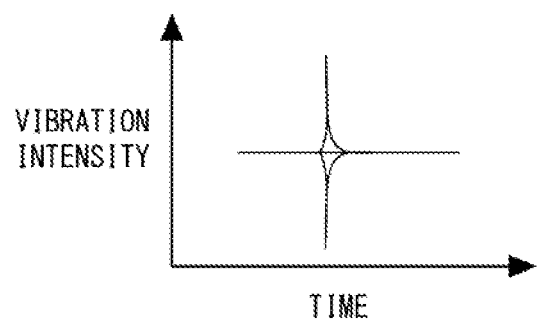
FIG. 8 is a diagram illustrating an example of a vibration pattern extracted by the assessment unit according to the first example embodiment.
Figure 9:
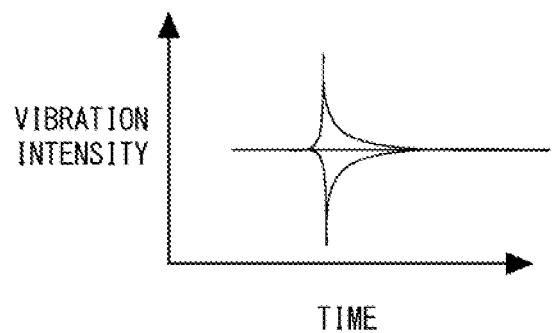
FIG. 9 is a diagram illustrating an example of a vibration pattern extracted by the assessment unit according to the first example embodiment.

FIGS. 8 and 9 schematically illustrate vibration patterns such as the one as illustrated in FIG. 7, where the horizontal and vertical axes in FIGS. 8 and 9 are similarly defined as in FIG. 7.

In the vibration patterns illustrated in FIGS. 8 and 9, when vibration occurs, the vibration is subsequently attenuated. This attenuation time differs depending on the degradation state of the pipe 30. Specifically, when the pipe 30 is in a normal state, the attenuation time is short, but the attenuation time increases as degradation of the pipe 30 progresses.

Therefore, in method A3, the assessment unit 22 determines the degradation state of the pipe 30 based on the length of the attenuation time in the vibration pattern of vibration detected by the optical fiber 10.

(A4) Method A4

Next, method A4 will be described.

Figure 10:
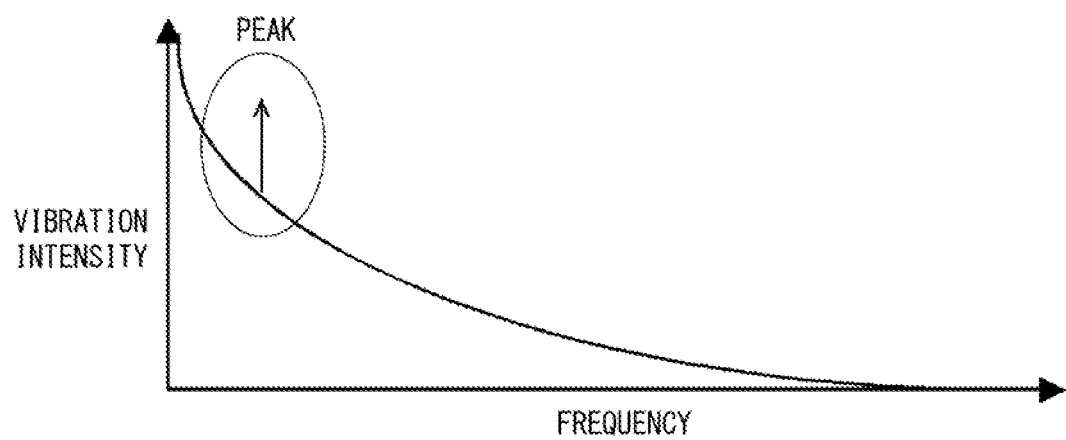
FIG. 10 is a diagram illustrating an example of a vibration pattern extracted by the assessment unit according to the first example embodiment.
Figure 11:
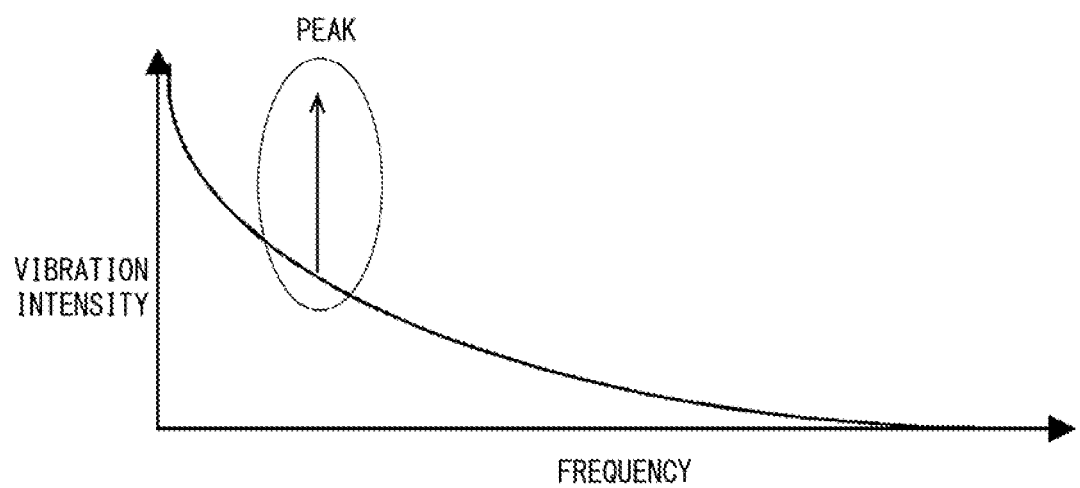
FIG. 11 is a diagram illustrating an example of a vibration pattern extracted by the assessment unit according to the first example embodiment.

FIGS. 10 and 11 schematically illustrate vibration patterns, such as the one illustrated in FIG. 7, after Fast Fourier Transform (FFT) processing vibration patterns that are generated when artificial vibration is generated in the pipe 30, where the horizontal axis indicates frequency and the vertical axis indicates vibration intensity.

In the vibration patterns illustrated in FIGS. 10 and 11, there is a frequency peak in the vibration intensity. The frequency at which this frequency peak occurs, differs according to the degradation state of the pipe 30. Specifically, in the vibration pattern of a degraded pipe 30, the frequency at which a frequency peak occurs shifts to a higher frequency side than in the vibration pattern of a normal pipe 30.

Therefore, in method A4, the assessment unit 22 determines the degradation state of the pipe 30, based on the frequency at which a frequency peak occurs in the vibration pattern of vibration detected by the optical fiber 10.

(A5) Method A5

Next, method A5 will be described.

Figure 12:
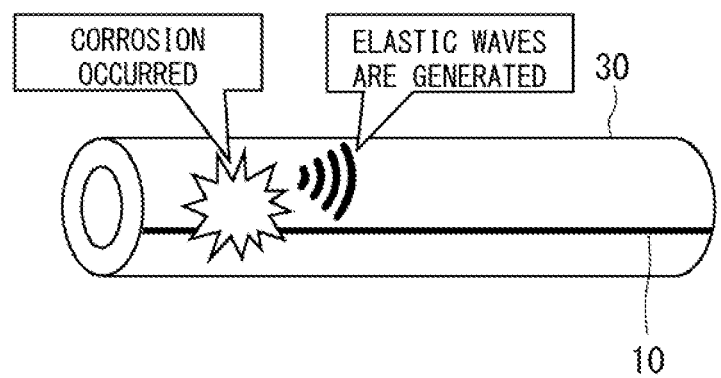
FIG. 12 is a diagram illustrating an example of a situation in which elastic waves are generated due to corrosion of a pipe.
Figure 13:
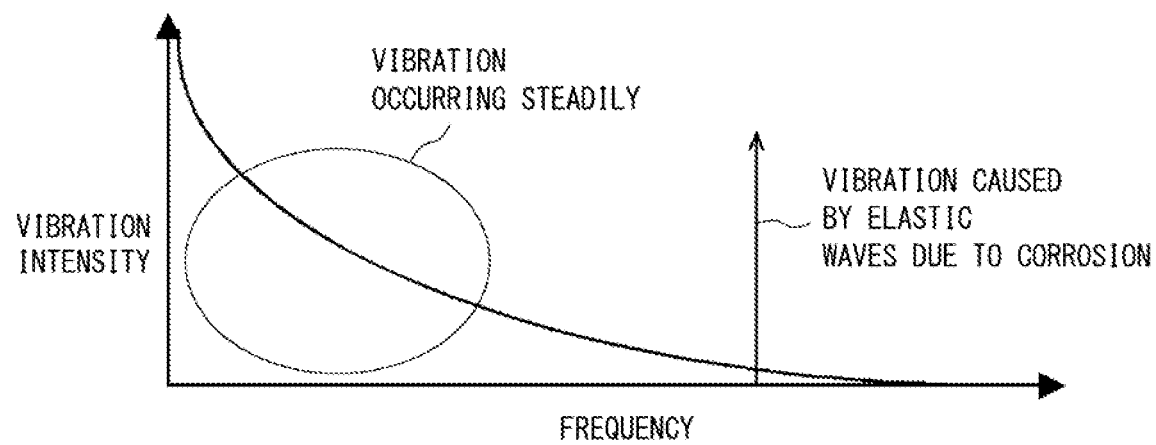
FIG. 13 is a diagram illustrating an example of a vibration pattern extracted by the assessment unit according to the first example embodiment.

FIG. 12 illustrates a situation when corrosion occurs in the pipe 30. FIG. 13 illustrates a vibration pattern, similar to those in FIGS. 10 and 11, when corrosion occurs in the pipe 30.

As illustrated in FIG. 12, elastic waves are generated when corrosion occurs in the pipe 30.

As illustrated in FIG. 13, vibration caused by elastic waves differs in the vibration characteristics from vibration that is generated in a steady state due to the flow of a substance or the like through the pipe 30. Specifically, vibration that occurs in a steady state in the pipe 30 occurs in a lower frequency band. On the other hand, vibration caused by elastic waves that are generated due to corrosion of the pipe 30 occurs in a higher frequency band.

Therefore, in method A5, the assessment unit 22 determines the degradation state of the pipe 30 based on whether or not there is vibration caused by elastic waves in a higher frequency band in the vibration pattern of vibration detected by the optical fiber 10.

(A6) Method A6

Next, method A6 will be described.

Figure 14:
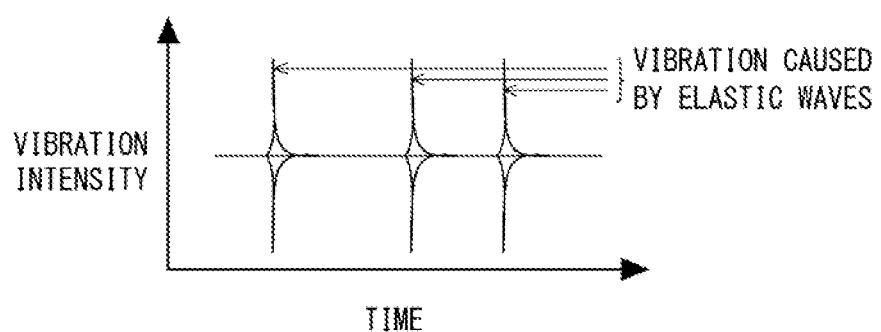
FIG. 14 is a diagram illustrating an example of a vibration pattern extracted by the assessment unit according to the first example embodiment.
Figure 15:
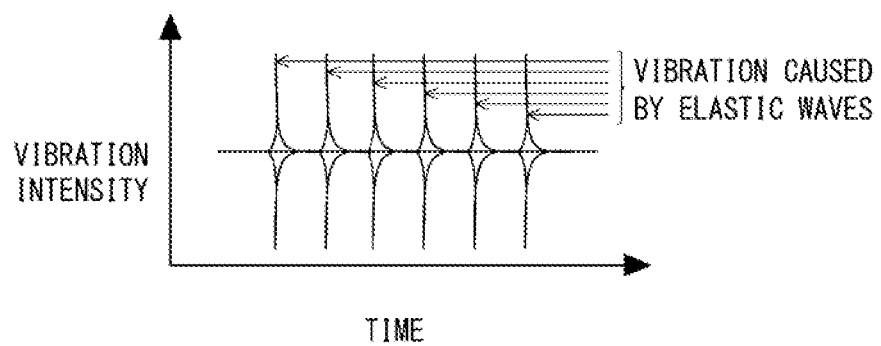
FIG. 15 is a diagram illustrating an example of a vibration pattern extracted by the assessment unit according to the first example embodiment.

FIGS. 14 and 15 illustrate vibration patterns, similar to those in FIGS. 8 and 9, when corrosion occurs in the pipe 30.

In the vibration patterns illustrated in FIGS. 14 and 15, vibration is caused by elastic waves that are generated due to corrosion of the pipe 30. The interval at which the vibration occurs varies depending on the progression rate of corrosion of the pipe 30. Specifically, in the vibration pattern of the pipe 30 where corrosion progression is minor, the frequency of occurrence of vibration caused by elastic waves per unit time is low. On the other hand, in the vibration pattern of the pipe 30 where corrosion progression is severe, the frequency of occurrence of vibration caused by elastic waves per unit time is high.

Therefore, in method A6, the assessment unit 22 determines the degradation state of the pipe 30 based on the frequency of occurrence of vibration caused by elastic waves in the vibration pattern of vibration detected by the optical fiber 10.

Figure 16:
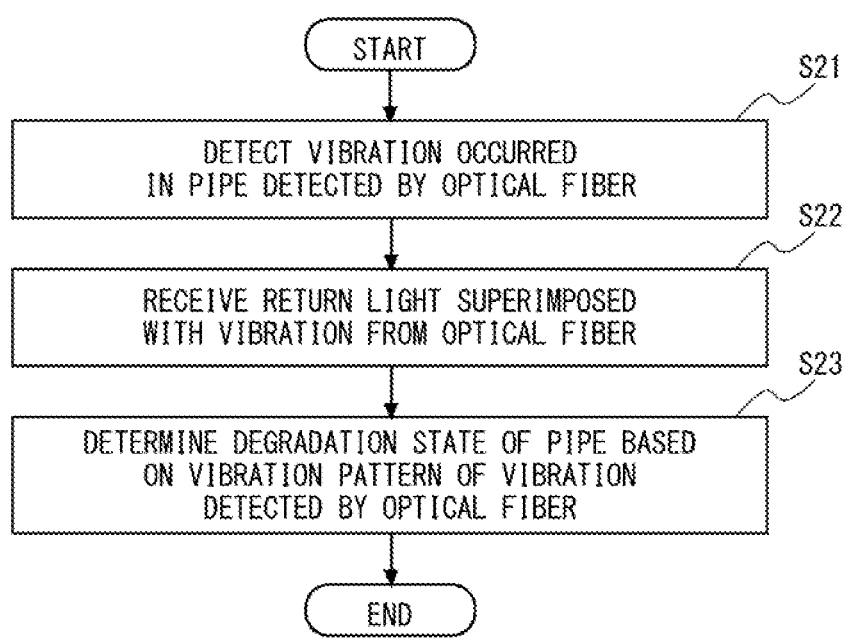
FIG. 16 is a flowchart illustrating an operation example of the optical fiber sensing system according to the first example embodiment.

The following will describe an operation example of the optical fiber sensing system according to the first example embodiment with reference to FIG. 16. As illustrated in FIG. 16, the optical fiber 10 detects vibration occurring in the pipe 30 (step S21). The vibration detected by the optical fiber 10 is superimposed on return light transmitted through the optical fiber 10.

The reception unit 21 then receives, from the optical fiber 10, the return light on which the vibration detected by the optical fiber 10 is superimposed (step S22).

The assessment unit 22 then extracts a vibration pattern of the vibration detected by the optical fiber 10 from the return light received by the reception unit 21, and determines the degradation state of the pipe 30 based on the extracted vibration pattern (step S23).

This determination may be performed, for example, using any of methods A1 to A5 described above.

As described above, according to the first example embodiment, the reception unit 21 receives, from the optical fiber 10 that is laid in the pipe 30, return light on which vibration detected by the optical fiber 10 is superimposed. The assessment unit 22 extracts the vibration pattern of the vibration detected by the optical fiber 10 from the return light and determines the degradation state of the pipe 30 based on the extracted vibration pattern.

Here, as long as the optical fiber 10 is laid in the pipe 30, the substance flowing through the pipe 30 does not have to be high temperature or the pipe 30 does not have to be covered with an insulation material as in Patent Literature 1. Therefore, the degradation state of the pipe 30 can be detected regardless of the substance flowing through the pipe 30 or the structure of the pipe 30.

Second Embodiment

An optical fiber sensing system according to a second example embodiment has a similar configuration as the above-described first example embodiment, with an extended function of the assessment unit 22.

The assessment unit 22 determines the degradation state of the pipe 30 based on the vibration pattern of vibration detected by the optical fiber 10, and further detects a sign of breakage of the pipe 30 based on the determined degradation state of the pipe 30.

The following will describe examples of how the assessment unit 22 detects a sign of breakage of the pipe 30 based on the degradation state of the pipe 30.

(B1) Method B1

First, method B1 will be described.

In method B1, as illustrated in FIG. 17, the assessment unit 22 stores in advance a correspondence table indicating the time of breakage for each degradation degree of the pipe 30, which is a time when the pipe 30 having the degradation degree is predicted to break in the future.

The assessment unit 22 first determines the degradation state (in this case, the degradation degree) of the pipe 30 using any of methods A1 to A5 described above and detects a sign of breakage of the pipe 30 based on the degradation degree of the pipe 30 and the correspondence table illustrated in FIG. 17. For example, the assessment unit 22 determines that there is a sign of breakage on the pipe 30 with degradation degree 2 and the breakage time is in two years.

(B2) Method B2

Next, method B2 will be described.

In method B2, the assessment unit 22 periodically (for example, annually) uses any one of above-described methods A1 to A5 to determine the degradation state of the pipe 30 and periodically stores the determined degradation state of the pipe 30. Then, the assessment unit 22 detects a sign of breakage of the pipe 30, based on a change in the degradation state of the pipe 30 over time.

Figure 18:
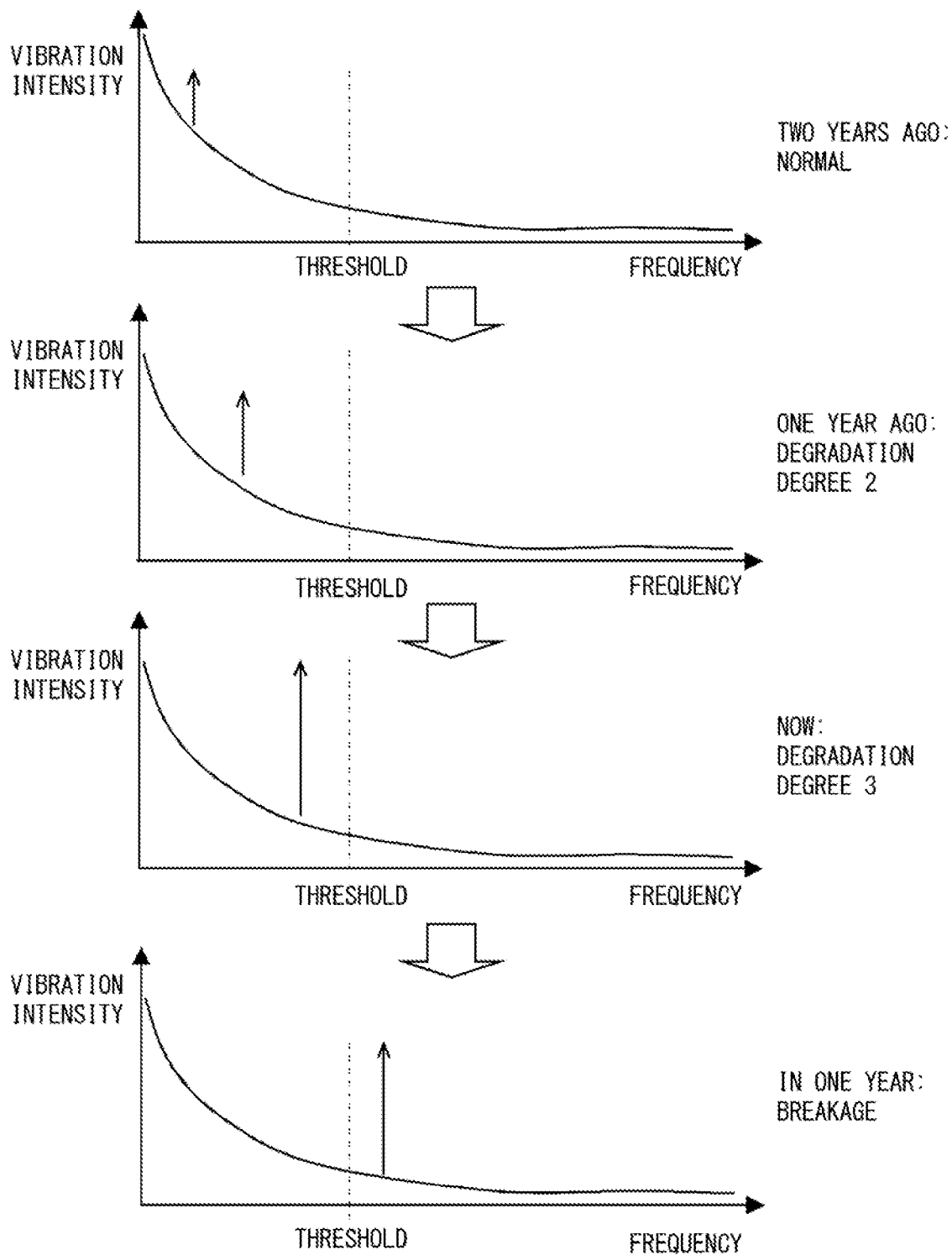
FIG. 18 is a diagram illustrating examples of vibration patterns, arranged in a time series, extracted by the assessment unit according to the second example embodiment.

FIG. 18 is a diagram for explaining method B2. Note that FIG. 18 is an example in which the assessment unit 22 uses above-described method A5 to determine the degradation state of the pipe 30, and illustrates a time series of vibration patterns similar to those in FIGS. 10 and 11.

In the example of FIG. 18, the assessment unit 22 periodically (here, annually) determines the degradation state of the pipe 30. Here, the assessment unit 22 determines that the pipe 30 was normal two years ago, but the degradation degree was 1 one year ago and the degradation degree is now 2.

The assessment unit 22 predicts a vibration pattern one year from now and the frequency at which a frequency peak occurs in the vibration pattern, based on the change over time in the vibration patterns of the pipe 30 two years ago, one year ago, and now. In the example of FIG. 18, as the result of prediction, the frequency at which a frequency peak occurs in the vibration pattern one year from now is located at a higher frequency side than a threshold. Therefore, the assessment unit 22 determines that the pipe 30 will break in one year.

Figure 19:
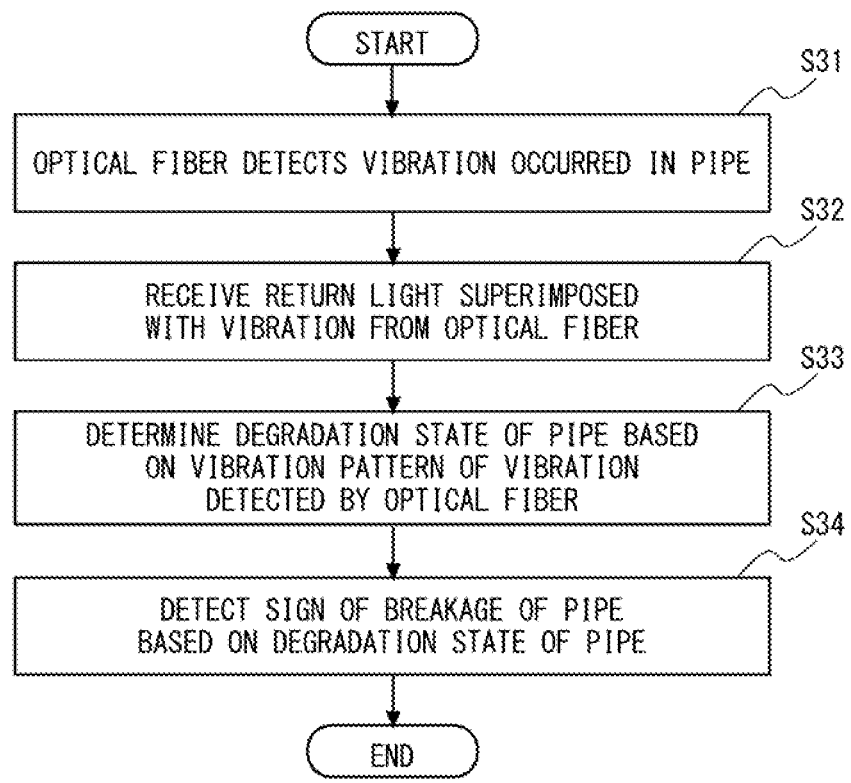
FIG. 19 is a flowchart illustrating an operation example of an optical fiber sensing system according to the second example embodiment.

The following will describe an operation example of the optical fiber sensing system of the second example embodiment with reference to FIG. 19.

As illustrated in FIG. 19, steps S31 to S33, which are similar to steps S21 to S23 illustrated in FIG. 16, are first performed.

Then, the assessment unit 22 detects a sign of breakage of the pipe 30, based on the degradation state of the pipe 30 determined at step S33 (step S34). This detection may be performed, for example, using either of method B1 or B2 described above.

As described above, according to the second example embodiment, the assessment unit 22 detects a sign of breakage of the pipe 30 based on the degradation state of the pipe 30.

This makes it possible to dispatch a worker to repair the pipe 30 and take other actions before the pipe 30 breaks and problems such as leakage of a substance flowing through the pipe 30 occur.

The other effects are similar to the above-described first example embodiment.

Third Embodiment

An optical fiber sensing system according to a third example embodiment has a similar configuration as the above-described second example embodiment, with a further extended function of the assessment unit 22.

The assessment unit 22 identifies a position where a sign of breakage of the pipe 30 is detected based on the return light received by the reception unit 21.

The following will describe examples of how the assessment unit 22 identifies a position where a sign of breakage of the pipe 30 is detected based on the returned light received by the reception unit 21.

(C1) Method C1

First, method C1 will be described.

In method C1, the assessment unit 22 first identifies the length of the optical fiber 10 from the reception unit 21 (the optical fiber sensing equipment 20) to a position where vibration occurred, based on a time difference between the time when the reception unit 21 injected pulsed light into the optical fiber 10 and the time when the reception unit 21 received the return light on which the vibration is superimposed. The identified length of the optical fiber 10 is defined as X[m].

Figure 20:
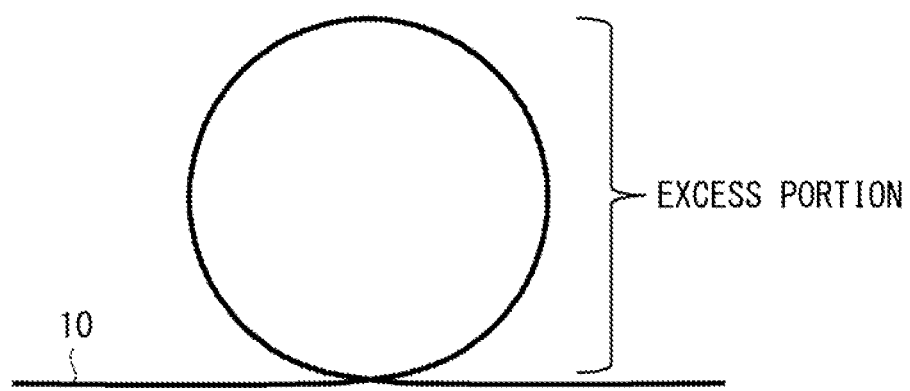
FIG. 20 is a diagram illustrating an example of an excess portion of an optical fiber.

When the optical fiber 10 is laid in the pipe 30, an excess portion may be generated as illustrated in FIG. 20. The length of this excess portion is defined as Y[m]. Note that the length of the excess portion Y[m] is assumed to be known in advance by the assessment unit 22.

Then, the assessment unit 22 identifies a distance Z[m] from the reception unit 21 to a position where vibration occurred by the following formula (1) using the above-described X and Y.

$$Z[m]=X[m]-Y[m] \qquad (1)$$

In addition, the assessment unit 22 stores in advance a correspondence table that associates a distance from the reception unit 21 with a location corresponding to the distance. This makes it possible to identify the position (location) where the vibration occurred. FIG. 21 illustrates an example of the correspondence table when the pipe 30 is supported by pillars 31 and laid above ground as illustrated in FIG. 2. In the example of FIG. 21, distances from the reception unit 21 are associated with the identification information of the pillars 31 installed at positions corresponding to the distances. For example, when the distance Z[m] from the reception unit 21 to the position where vibration occurred is xx[m], the assessment unit 22 determines that the location where the vibration occurred is a location where the pillar 31A is located. Note that, although the correspondence table in FIG. 21 is a table that associates a distance from of the reception unit 21 with the identification information of a pillar 31, the identification information that is associated with the distance is not limited to the pillar 31, but can be any information that identifies a location, such as information that identifies an area.

To identify a position where a sign of breakage of the pipe 30 is detected, the assessment unit 22 identifies the position where the vibration of the vibration pattern used for detecting the sign of breakage of the pipe 30 occurred as described above. Then, the assessment unit 22 determines that the identified position is the position where the sign of breakage of the pipe 30 is detected.

Note that the assessment unit 22 may identify the position where a sign of breakage is detected upon detection of the sign of breakage of the pipe 30. Alternatively, the assessment unit 22 may pre-identify the position where vibration occurred at a time when the reception unit 21 receives the return light on which the vibration is superimposed, and then, the assessment unit 22 may determine that the pre-identified position is the position where a sign of breakage of the pipe 30 is detected when the sign of breakage of the pipe 30 is detected using the vibration pattern of the vibration.

(C2) Method C2

Next, method C2 will be described. Method C2 is different from method C1 in the way of identifying the length X[m] of the optical fiber 10 from the reception unit 21 to a position where vibration occurred, but is otherwise similar to method C1.

In method C2, the assessment unit 22 compares, among lengths of the optical fiber 10 from the reception unit 21, the vibration intensities detected at positions corresponding to the lengths, and, based on the comparison result, identifies the length X [m] of the optical fiber 10 from the reception unit 21 to the position where the vibration occurred.

Figure 22:
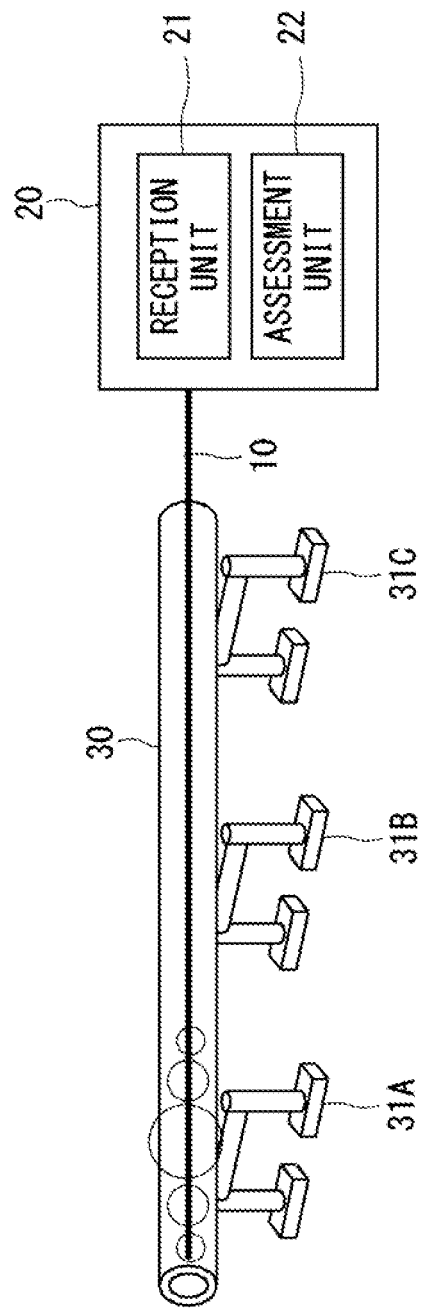
FIG. 22 is a diagram illustrating, in the assessment unit according to the third example embodiment, an example of a method for identifying the length of an optical fiber from a reception unit to a position where vibration occurred.

For example, it is assumed that vibration is detected for each length of the optical fiber 10 from the reception unit 21, as illustrated in FIG. 22. In the example of FIG. 22, the vibration intensity is indicated by the size of a circle, where the larger the size of the circle, the greater the vibration intensity. In this case, the assessment unit 22 identifies the position where vibration occurred according to the distribution of the vibration intensities. In the example of FIG. 22, since the vibration intensity increases near the pillar 31A, the assessment unit 22 identifies the length X[m] of the optical fiber 10 from the reception unit 21 to the vicinity of the pillar 31A.

Figure 23:
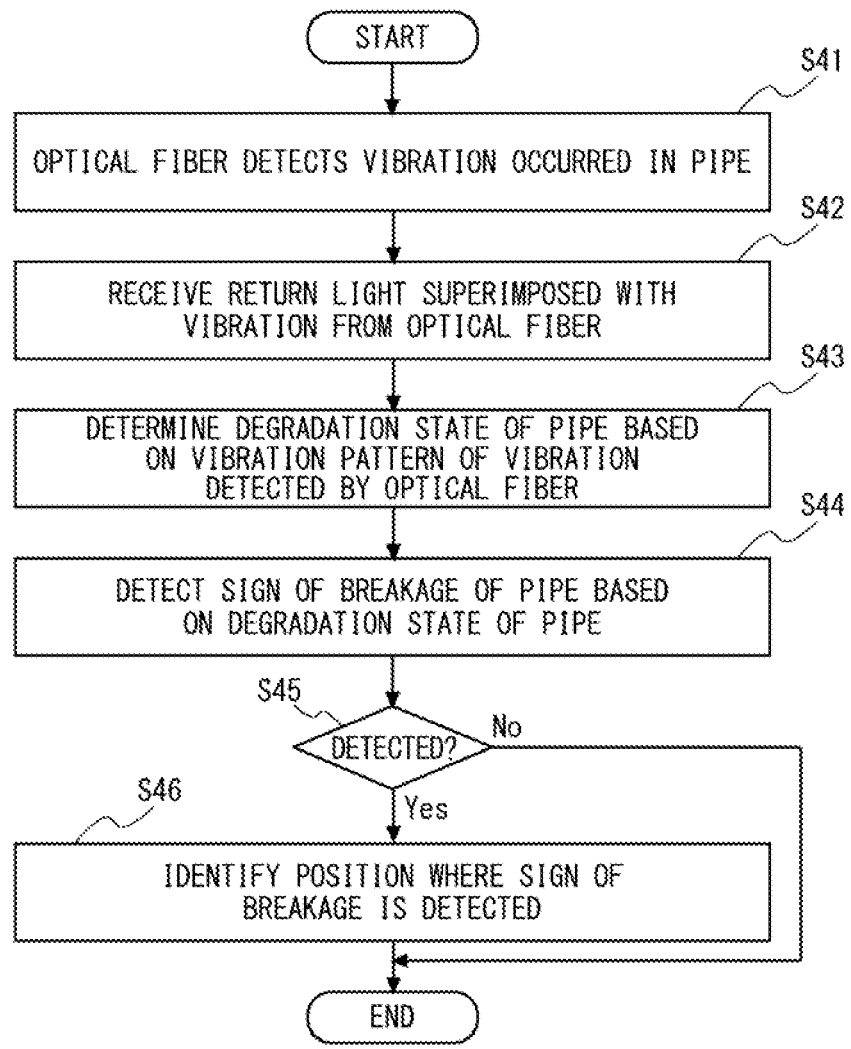
FIG. 23 is a flowchart illustrating an operation example of the optical fiber sensing system according to the third example embodiment.

The following will describe an operation example of the optical fiber sensing system of the third example embodiment with reference to FIG. 23. FIG. 23 is an example of identifying a position where a sign of breakage of the pipe 30 is detected at a time when the sign of the breakage is detected.

As illustrated in FIG. 23, steps S41 to S44, which are similar to steps S31 to S34 illustrated in FIG. 19, are first performed.

When a sign of breakage of the pipe 30 is detected at step S44 (Yes at step S45), then the assessment unit 22 identifies the position where the sign of breakage of the pipe 30 is detected based on the return light received by the reception unit 21 (step S46). This identification may be performed, for example, using either of method C1 or C2 described above.

Figure 24:
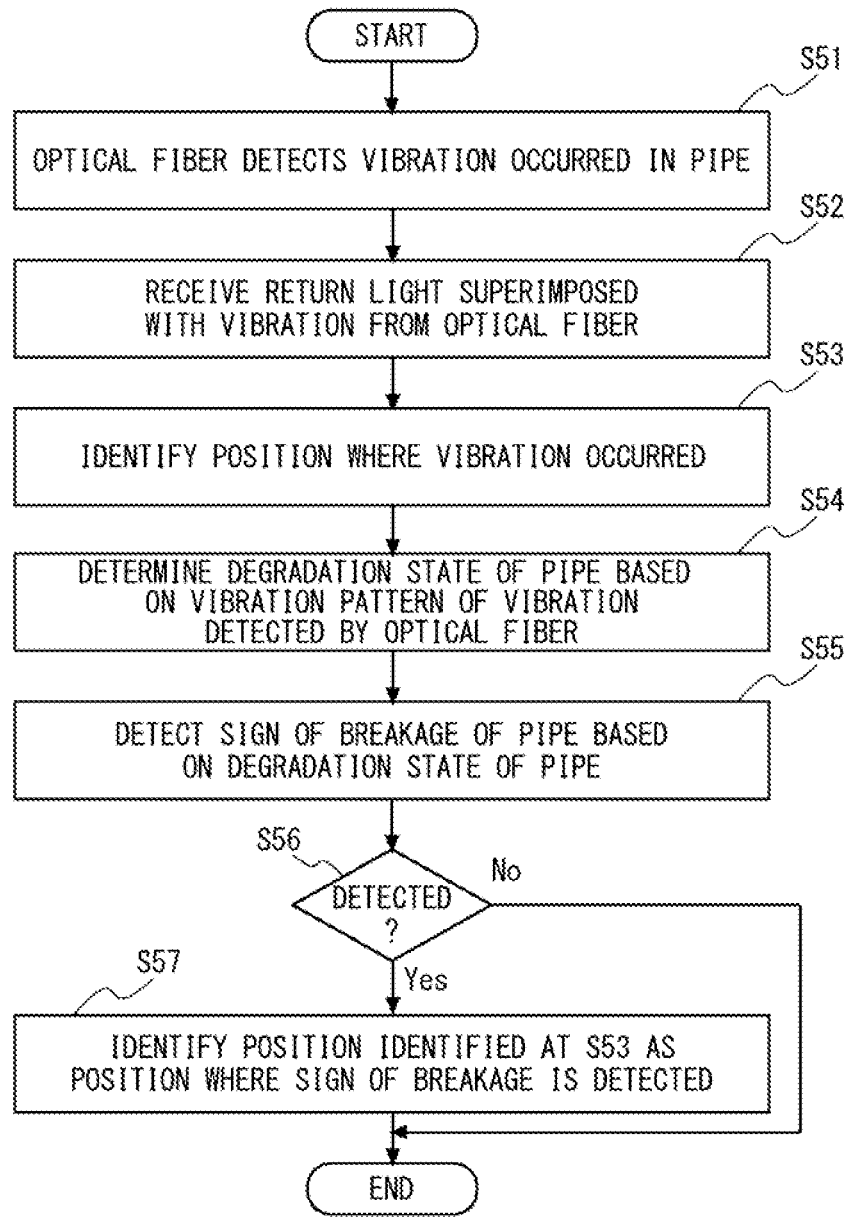
FIG. 24 is a flowchart illustrating another operation example of the optical fiber sensing system according to the third example embodiment.

The following will describe another operation example of the optical fiber sensing system of the third example embodiment with reference to FIG. 24. FIG. 24 is an example in which, at a time when the reception unit 21 receives return light on which vibration is superimposed, the position where the vibration occurred is pre-identified, and the pre-identified position is used as the position where a sign of breakage of the pipe 30 is detected.

As illustrated in FIG. 24, first, steps S51 to S52, which are similar to steps S31 to S32 illustrated in FIG. 19, are performed.

The assessment unit 22 then identifies the position where the vibration superimposed on the return light occurred based on the return light received by the reception unit 21 (step S53). This identification may be performed, for example, using either of method C1 or C2 described above.

Then, steps S54 to S55, which are similar to steps S33 to S34 illustrated in FIG. 19, are performed.

When a sign of breakage of the pipe 30 is detected at step S55 (Yes at step S56), then, the assessment unit 22 subsequently identifies the position that was pre-identified at step S53 as the position where the sign of breakage of the pipe 30 is detected (Step S57).

As described above, according to the third example embodiment, the assessment unit 22 detects a sign of breakage of the pipe 30 based on the degradation state of the pipe 30 and identifies the location where the sign of breakage of the pipe 30 is detected based on the returned light received by the reception unit 21.

This makes it possible to dispatch a worker to repair the pipe 30 and take other actions before the pipe 30 breaks and problems such as leakage of a substance flowing through the pipe 30 occur. Further, since the position where the sign of breakage of the pipe 30 is detected can be identified, for example, even when the pipe 30 is laid over a wide area, the position where the sign of breakage is detected can be accurately grasped so that a worker can be dispatched.

The other effects are similar to the above-described first example embodiment.

Figure 25:
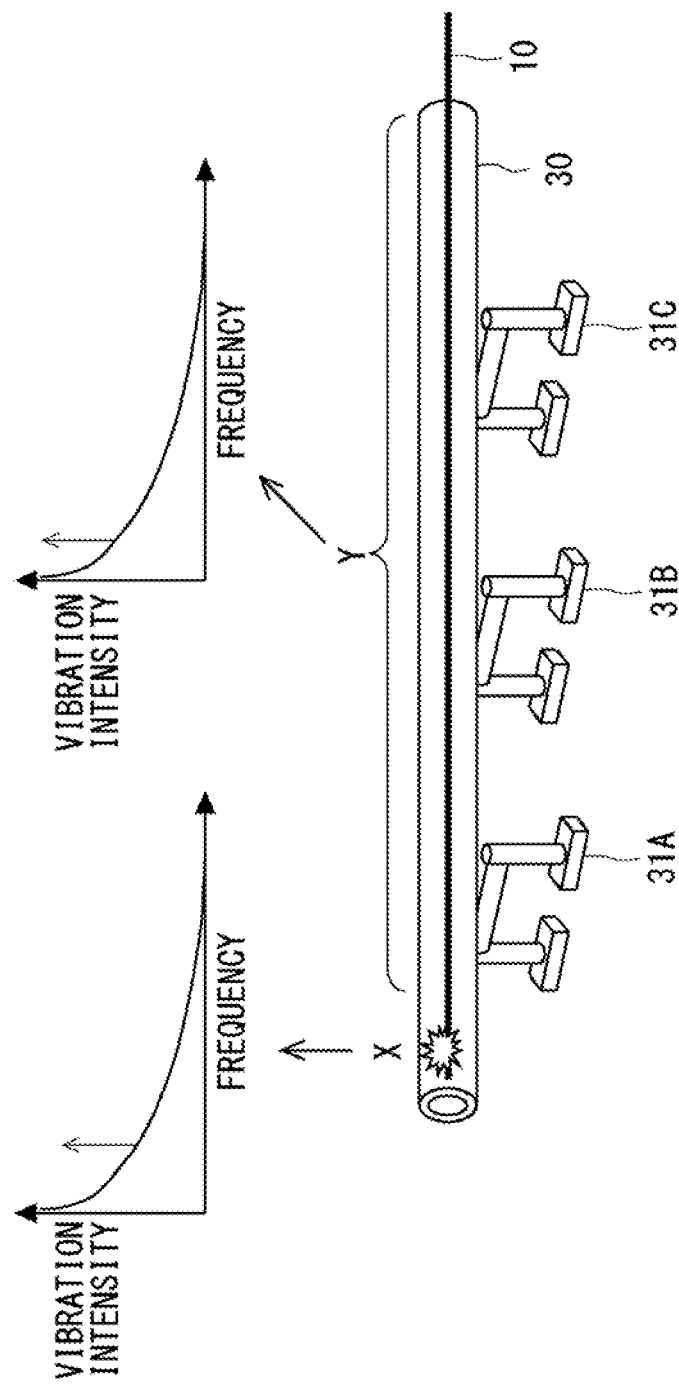
FIG. 25 is a diagram illustrating a modified example of the optical fiber sensing system according to the third example embodiment.

The following will describe a modified example of the third example embodiment with reference to FIG. 25.

As illustrated in FIG. 25, in this modified example, the assessment unit 22 extracts vibration patterns of vibration detected at a plurality of points within a section on the optical fiber 10 where the material of the pipe 30 is the same and the substance flowing through the pipe 30 is the same.

The assessment unit 22 then compares the vibration patterns detected at the plurality of points, and identifies a position where degradation has occurred or a position where there is a sign of breakage based on the comparison result.

For example, when vibration patterns detected at some points are different from vibration patterns detected at the other points, the assessment unit 22 determines that degradation has occurred or there is a sign of breakage at the points where different vibration patterns were detected.

At this time, the assessment unit 22 may determine whether or not the vibration patterns detected at some points are different from the vibration patterns detected at the other points, for example, in the following manner. First, the assessment unit 22 identifies the range of normal vibration patterns based on the distribution, average, and the like of the vibration patterns detected at a plurality of points. Then, the assessment unit 22 determines that, among the vibration patterns detected at the plurality of points, a vibration pattern outside the range of the normal vibration patterns is different from the vibration patterns detected at the other points.

For example, in the example of FIG. 25, the assessment unit 22 extracts vibration patterns such as those illustrated in FIGS. 10 and 11 as the vibration patterns of vibration detected at a plurality of points, and compares the frequencies at which frequency peaks occur between the vibration patterns. As the result, in the vibration pattern detected at point X, the frequency at which a frequency peak occurs is shifted to a higher frequency side as compared with the vibration pattern detected at the other point in the section Y. Thus, the assessment unit 22 determines that degradation has occurred at point X or that there is a sign of breakage at point X. Note that the position of point X may be identified by using, for example, either of above-mentioned method C1 or C2.

Note that, in the example of FIG. 25, vibration patterns such as those as illustrated in FIGS. 10 and 11 were extracted, but the present invention is not limited thereto, and other vibration patterns may be extracted.

Fourth Embodiment

Figure 26:
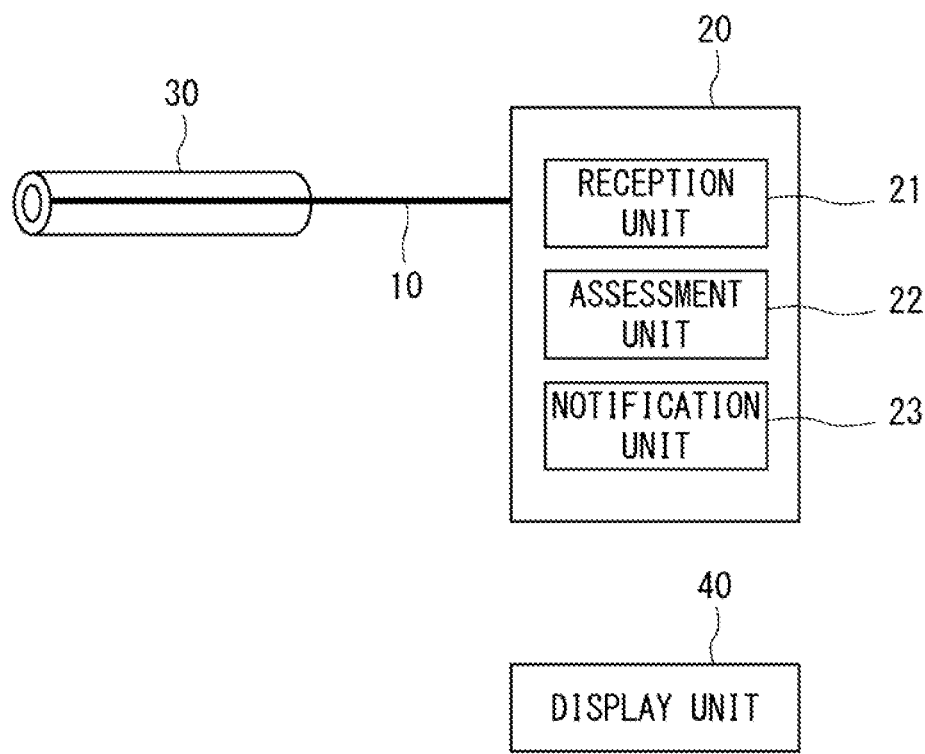
FIG. 26 is a diagram illustrating a configuration example of an optical fiber sensing system according to a fourth example embodiment.

The following will describe a configuration example of an optical fiber sensing system according to a fourth example embodiment with reference to FIG. 26.

As illustrated in FIG. 26, the optical fiber sensing system according to the fourth example embodiment differs from the configurations of the above-described first to third example embodiments in that a display unit 40 is additionally supplied and a notification unit 23 is additionally supplied to the optical fiber sensing equipment 20.

The notification unit 23 notifies an alert when the assessment unit 22 detects a sign of breakage of the pipe 30. At this time, the notification unit 23 may notify the position where the sign of breakage of the pipe 30 is detected. The notification destination may be, for example, a monitoring system for monitoring the pipe 30, a monitoring terminal in a monitoring room or the like for monitoring the pipe 30, or a user terminal. Further, the notification method may be, for example, a method of displaying a Graphical User Interface (GUI) screen on a display unit 40 such as a display or a monitor of the notification destination. Further, the notification method may be a method of outputting a voice message from a speaker (not illustrated) of the notification destination.

Figure 27:
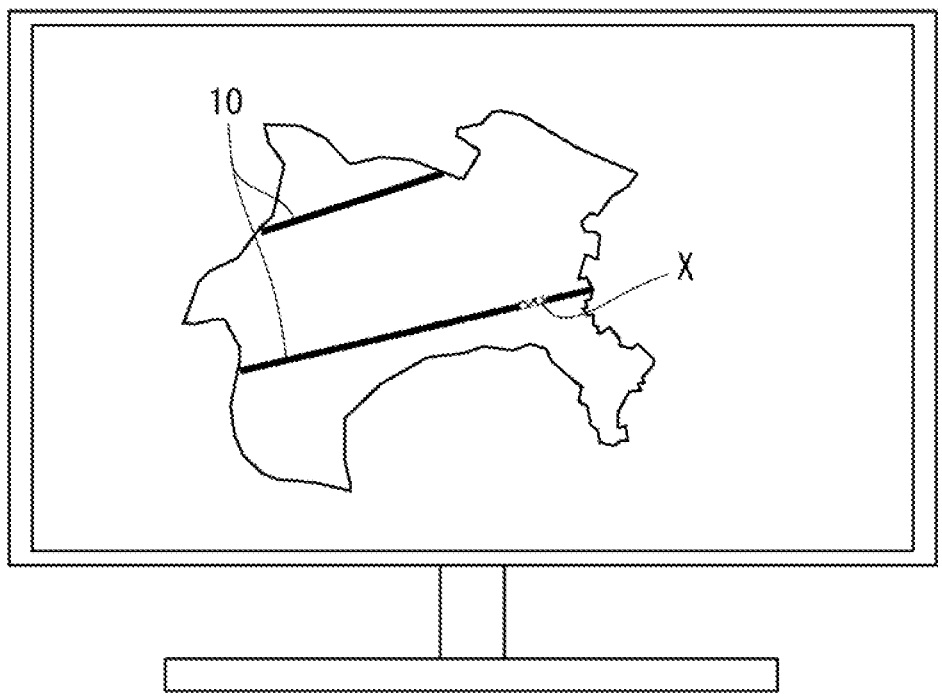
FIG. 27 is a diagram illustrating an example of a GUI screen used for notification by a notification unit according to the fourth example embodiment.

Further, the notification unit 23 may store information indicating the position where the optical fiber 10 laid in the pipe 30 is laid and map information in association with each other. Then, when the assessment unit 22 detects a sign of breakage of the pipe 30, the notification unit 23 may map and display the position where the sign of breakage of the pipe 30 was detected on a map displayed on the display unit 40. FIG. 27 illustrates an example of a GUI screen that maps and displays the position where a sign of breakage of the pipe 30 was detected on a map. In the example of FIG. 27, the position where the optical fiber 10 is laid is mapped and displayed, as well as, the position X where the sign of breakage of the pipe 30 was detected is mapped and displayed on the map. At this time, the notification unit 23 may display the current degradation state of the position where the sign of breakage of the pipe 30 was detected. Note that the map illustrated in FIG. 27 can be enlarged or reduced as needed.

Figure 28:
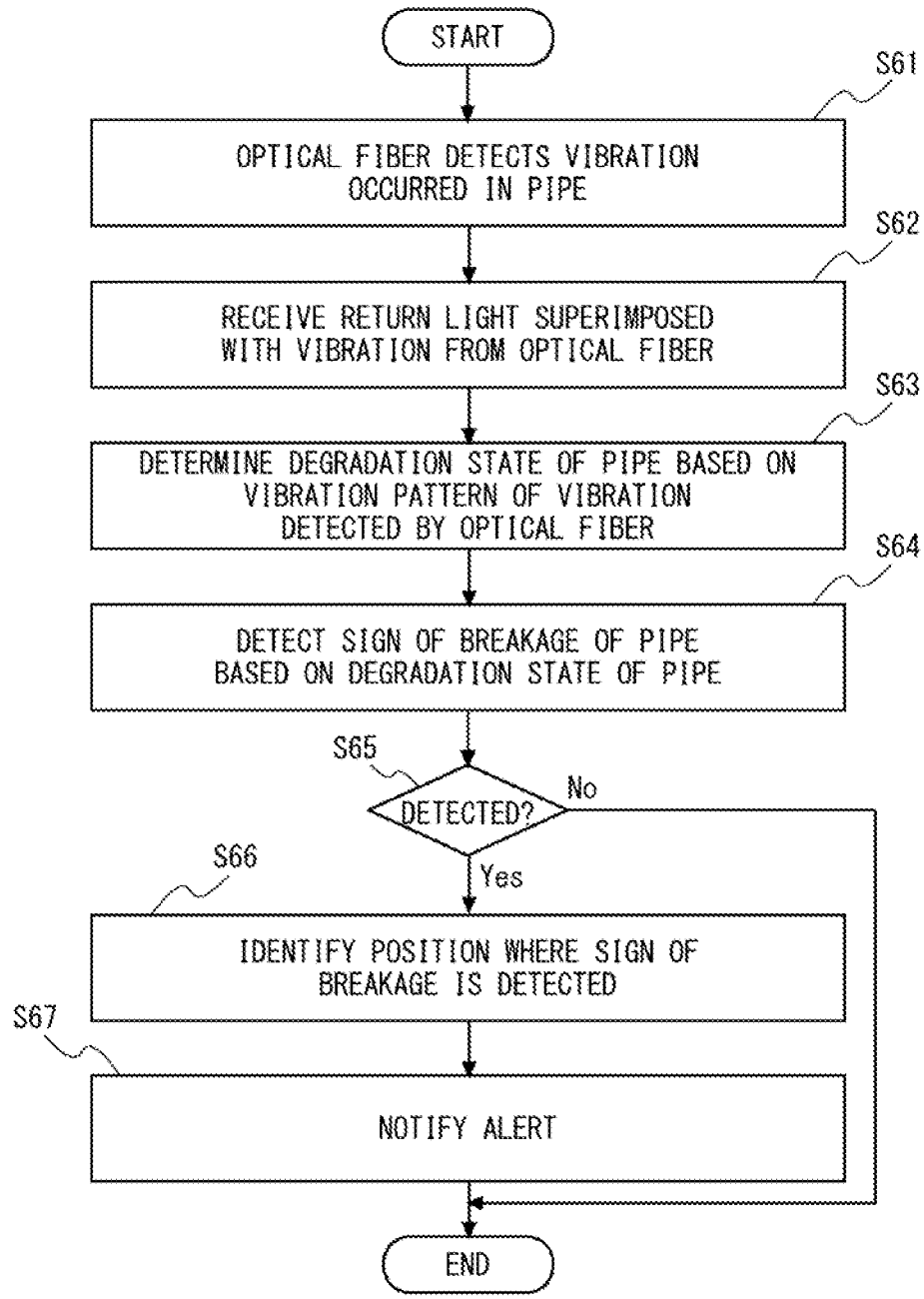
FIG. 28 is a flowchart illustrating an operation example of the optical fiber sensing system according to the fourth example embodiment.

The following will describe an operation example of the optical fiber sensing system of the fourth example embodiment with reference to FIG. 28. As illustrated in FIG. 28, first, steps S61 to S66, which are similar to steps S41 to S46 in FIG. 23, are performed.

When the assessment unit 22 detects a sign of breakage of the pipe 30 at step S64 (Yes at step S65) and identifies the position where the sign of breakage of the pipe 30 is detected (step S66), the notification unit 23 subsequently notifies an alert (step S67). This notification may be performed using, for example, the GUI screen illustrated in FIG. 27 described above.

Note that the operation example illustrated in FIG. 28 is only an example without limitation. The operation example illustrated in FIG. 28 may be modified, for example, by adding step S67 illustrated in FIG. 28 to the operation example illustrated in FIG. 24.

The notification unit 23 notifies an alert only when a sign of breakage of the pipe 30 is detected in the example of FIG. 28, although the present invention is not limited thereto. For example, the notification unit 23 may notify an alert when the degradation degree is equal to or higher than a threshold as the result of determining the degradation state of the pipe 30, or notify the determined degradation state of the pipe 30 regardless of the degradation degree. Further, similarly to FIG. 27, the notification unit 23 may map and display a position where the degradation degree of the pipe 30 is equal to or higher than the threshold or a position where the degradation state of the pipe 30 is determined on a map displayed on the display unit 40.

As described above, according to the fourth example embodiment, the notification unit 23 notifies an alert when the assessment unit 22 detected a sign of breakage of the pipe 30. As the result, it is possible to notify the monitoring system, the monitoring room, or the like that monitors the pipe 30 that the sign of breakage of the pipe 30 has been detected.

The other effects are the similar to the above-described first example embodiment.

OTHER EMBODIMENTS

In the above-described example embodiments, the assessment unit 22 determines the degradation state of the pipe 30, based on the vibration pattern of vibration detected by the optical fiber 10. The assessment unit 22 may determine the degradation state of the pipe 30 by further taking into account the pipe information that is stored in advance for the pipe 30. The pipe information includes, for example, the material and thickness of the pipe 30, the type of a substance flowing through the pipe 30, the flow rate of the substance flowing through the pipe 30, and the like. This can improve determination accuracy. Note that, to take the pipe information into account, for example, when using above-described method A1 for determining the degradation state of the pipe 30, the matching pattern may be changed according to the pipe information. Further, when above-described method A2 is used for determining the degradation state of the pipe 30, it is conceivable to change the training model according to the pipe information.

Further, among the above-described pipe information, the assessment unit 22 may determine the type and flow rate of the substance flowing through the pipe 30 based on the vibration pattern of vibration detected by the optical fiber 10. As the determination method, a method of using pattern matching as in above-described method A1, a method of using a learning model as in above-described method A2, or the like can be considered. Further, the optical fiber 10 can detect not only vibration but also sound and temperature. As such, the assessment unit 22 may determine the type of the substance flowing through the pipe 30 by using at least one of the vibration, sound, and temperature detected by the optical fiber 10.

Although the optical fiber sensing equipment 20 is provided with a plurality of components (the reception unit 21, the assessment unit 22, and the notification unit 23) in the above-described example embodiments, the present invention is not limited thereto. The components provided in the optical fiber sensing equipment 20 are not limited to be provided in one device, and may be distributed over a plurality of devices.

Hardware Configuration of Optical Fiber Sensing Equipment

Figure 29:
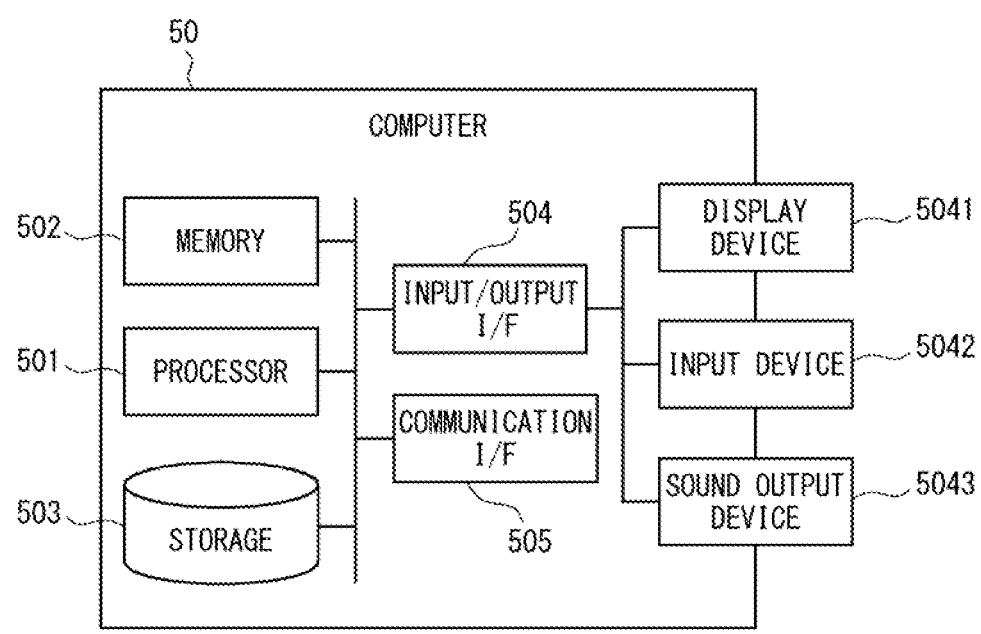
FIG. 29 is a block diagram illustrating an example of a hardware configuration of a computer that realizes the optical fiber sensing equipment according to the example embodiments.

The following will describe the hardware configuration of a computer 50 that realizes the optical fiber sensing equipment 20 with reference to FIG. 29.

As illustrated in FIG. 29, the computer 50 comprises a processor 501, a memory 502, a storage 503, an input/output interface (input/output I/F) 504, a communication interface (communication I/F) 505 and the like. The processor 501, the memory 502, the storage 503, the input/output interface 504, and the communication interface 505 are connected through a data transmission line for transmitting and receiving data to and from one another.

The processor 501 is, for example, an arithmetic processing unit such as a Central Processing Unit (CPU) and a Graphics Processing Unit (GPU). The memory 502 is, for example, a memory such as a Random Access Memory (RAM) and a Read Only Memory (ROM). The storage 503 is, for example, a storage device such as a Hard Disk Drive (HDD), a Solid State Drive (SSD), and a memory card. Alternatively, the storage 503 may be a memory such as a RAM and a ROM.

The storage 503 stores programs that realize the functions of the components (the reception unit 21, the assessment unit 22, and the notification unit 23) provided in the optical fiber sensing equipment 20. The processor 501 realizes the functions of the components provided in the optical fiber sensing equipment 20 by executing these programs. Here, when executing each of the above programs, the processor 501 may load the program on the memory 502 and then execute the program, or may execute the program without loading the program on the memory 502. The memory 502 and the storage 503 also play a role of storing information and data retained by the components provided in the optical fiber sensing equipment 20.

The above-described programs are stored using any of various types of non-transitory computer readable media and can be supplied to a computer (including the computer 50). The non-transitory computer readable media include various types of tangible storage media. Examples of the non-transitory computer readable media include magnetic recording media (for example, flexible discs, magnetic tapes, hard disk drives), magneto-optical recording media (for example, magneto-optical discs), Compact Disc-ROMs (CD-ROMs), CD-Recordables (CD-Rs), CD-ReWritables (CD-R/Ws), semiconductor memories (for example, mask ROMs, Programmable ROMs (PROMs), Erasable PROMs (EPROMs), flash ROMs, and RAMs. The programs may also be supplied to a computer through any of various types of transitory computer readable media. Examples of the transitory computer readable media include electrical signal, optical signal, and electromagnetic waves. The transitory computer readable media can supply the programs to the computer via a wired communication path, such as an electric wire and an optical fiber, or a wireless communication path.

The input/output interface 504 is connected to a display device 5041, an input device 5042, a sound output device 5043, and the like. The display device 5041 is a device that displays a screen corresponding to drawing data processed by the processor 501, such as a Liquid Crystal Display (LCD), a Cathode Ray Tube (CRT) display, and a monitor. The input device 5042 is a device that receives an operator's operation input, and is, for example, a keyboard, a mouse, a touch sensor, or the like. The display device 5041 and the input device 5042 may be integrated and realized as a touch panel. The sound output device 5043 is a device, such as a speaker, that acoustically outputs sound corresponding to acoustic data processed by the processor 501.

The communication interface 505 transmits/receives data to/from an external device. For example, the communication interface 505 communicates with an external device via a wired communication path or a wireless communication path.

Although the present disclosure has been described above with reference to the example embodiments, the present disclosure is not limited to the above-described example embodiments. Various changes that can be understood by those skilled in the art can be made to the structure and details of the present disclosure within the scope of the present disclosure.

For example, some or all of the above-described example embodiments may be used in combination.

In addition, some or all of the above-described example embodiments may also be described as in the following Supplementary Notes, but are not limited to the following.

(Supplementary Note 1)
An optical fiber sensing system comprising:
an optical fiber that is laid in a pipe;
a reception unit configured to receive, from the optical fiber, an optical signal superimposed with vibration detected by the optical fiber; and
an assessment unit configured to extract a vibration pattern of the vibration detected by the optical fiber from the optical signal and determine a degradation state of the pipe based on the extracted vibration pattern.

(Supplementary Note 2)
The optical fiber sensing system according to Supplementary Note 1, wherein the assessment unit detects a sign of breakage of the pipe based on the degradation state.

(Supplementary Note 3)
The optical fiber sensing system according to Supplementary Note 2, wherein the assessment unit identifies a position where a sign of breakage of the pipe is detected based on the optical signal.

(Supplementary Note 4)
The optical fiber sensing system according to any one of Supplementary Notes 1 to 3, wherein the assessment unit extracts vibration patterns at a plurality of locations of the pipe from the optical signal and determines a degradation state of at least one of the plurality of locations, based on the vibration patterns at the plurality of locations of the pipe.

(Supplementary Note 5)
The optical fiber sensing system according to any one of Supplementary Notes 1 to 4, wherein the assessment unit compares a vibration pattern of the vibration detected by the optical fiber with a matching pattern and determines a degradation state of the pipe based on the comparison result.

(Supplementary Note 6)
The optical fiber sensing system according to Supplementary Note 5, wherein the assessment unit changes the matching pattern according to a substance flowing through the pipe.

(Supplementary Note 7)
The optical fiber sensing system according to Supplementary Note 3 further comprising a notification unit configured to notify an alert when the assessment unit detects a sign of breakage of the pipe.

(Supplementary Note 8)
The optical fiber sensing system according to Supplementary Note 7 further comprising a display unit,
wherein, when the assessment unit detects a sign of breakage of the pipe, the notification unit maps and displays a position where the sign of breakage of the pipe is detected on the display unit.

(Supplementary Note 9)
Optical fiber sensing equipment comprising:
a reception unit configured to receive, from an optical fiber, an optical signal superimposed with vibration detected by the optical fiber that is laid in a pipe; and
an assessment unit configured to extract a vibration pattern of the vibration detected by the optical fiber from the optical signal and determine a degradation state of the pipe based on the extracted vibration pattern.

(Supplementary Note 10)
The optical fiber sensing equipment according to Supplementary Note 9, wherein the assessment unit detects a sign of breakage of the pipe based on the degradation state.

(Supplementary Note 11)
The optical fiber sensing equipment according to Supplementary Note 10, wherein the assessment unit identifies a position where a sign of breakage of the pipe is detected based on the optical signal.

(Supplementary Note 12)
The optical fiber sensing equipment according to any one of Supplementary Notes 9 to 11, wherein the assessment unit extracts vibration patterns at a plurality of locations of the pipe from the optical signal and determines a degradation state of at least one of the plurality of locations based on the vibration patterns at the plurality of locations of the pipe.

(Supplementary Note 13)
The optical fiber sensing equipment according to any one of Supplementary Notes 9 to 12, wherein the assessment unit compares a vibration pattern of the vibration detected by the optical fiber with a matching pattern and determines a degradation state of the pipe based on the comparison result.

(Supplementary Note 14)
The optical fiber sensing equipment according to Supplementary Note 13, wherein the assessment unit changes the matching pattern according to a substance flowing through the pipe.

(Supplementary Note 15)
The optical fiber sensing equipment according to Supplementary Note 11 further comprising a notification unit configured to notify an alert when the assessment unit detects a sign of breakage of the pipe.

(Supplementary Note 16)
The optical fiber sensing equipment according to Supplementary Note 15, wherein, when the assessment unit detects a sign of breakage of the pipe, the notification unit maps and displays a position where the sign of breakage of the pipe is detected on a display unit.

(Supplementary Note 17)
A method for detecting pipe degradation using an optical fiber sensing system, including:

a step for detecting a vibration by an optical fiber that is laid in a pipe;

a receiving step for receiving, from the optical fiber, an optical signal superimposed with vibration detected by the optical fiber; and an assessment step for extracting a vibration pattern of the vibration detected by the optical fiber from the optical signal and determining a degradation state of the pipe based on the extracted vibration pattern.

(Supplementary Note 18)

The method for detecting pipe degradation according to Supplementary Note 17, wherein at assessment step detects a sign of breakage of the pipe based on the degradation state.

(Supplementary Note 19)

The method for detecting pipe degradation according to Supplementary Note 18, wherein the assessment step identifies a position where a sign of breakage of the pipe is detected based on the optical signal.

(Supplementary Note 20)

The method for detecting pipe degradation according to any one of Supplementary Notes 17 to 19, wherein the assessment step extracts vibration patterns at a plurality of locations of the pipe from the optical signal and determines a degradation state of at least one of the plurality of locations based on the vibration patterns at the plurality of locations of the pipe.

(Supplementary Note 21)

The method for detecting pipe degradation according to any one of Supplementary Notes 17 to 20, wherein the assessment step compares a vibration pattern of the vibration detected by the optical fiber with a matching pattern and determines a degradation state of the pipe based on the comparison result.

(Supplementary Note 22)

The method for detecting pipe degradation according to Supplementary Note 21, wherein the assessment step changes the matching pattern according to a substance flowing through the pipe.

(Supplementary Note 23)

The method for detecting pipe degradation according to Supplementary Note 19 further including a notification step for notifying an alert when a sign of breakage of the pipe is detected at the assessment step.

(Supplementary Note 24)

The method for detecting pipe degradation according to Supplementary Note 23, wherein, when the assessment step detects a sign of breakage of the pipe, the notification step maps and displays a position where the sign of breakage of the pipe is detected on a display unit.

The present application claims the benefit of priority of Japanese Patent Application No. 2019-131495 filed on Jul. 16, 2019, the entire contents of which are incorporated herein by reference.

REFERENCE SIGNS LIST

10 Optical fiber
20 Optical fiber sensing equipment
21 Reception unit
22 Assessment unit
23 Notification unit
30 Pipe
31A to 31C Pillars
40 Display unit
50 Computer
501 Processor
502 Memory
503 Storage
504 Input/output interface
5041 Display device
5042 Input device
5043 Sound output device
505 Communication interface

What is claimed is:

1. An optical fiber sensing system comprising:
    an optical fiber that is laid in a pipe;
    a processor; and
    a memory storing instructions executable by the processor to:
        receive, from the optical fiber, an optical signal superimposed with vibration detected by the optical fiber;
        extract a vibration pattern of the vibration detected by the optical fiber from the optical signal;
        change a matching pattern according to a substance flowing through the pipe;
        compare the vibration pattern of the vibration detected by the optical fiber with the changed matching pattern; and
        determine a degradation state of the pipe based on a comparison result.

2. The optical fiber sensing system according to claim 1, wherein the instructions are executable by the processor to further detect a sign of breakage of the pipe based on the degradation state.

3. The optical fiber sensing system according to claim 2, wherein the instructions are executable by the processor to further identify a position where the sign of breakage of the pipe is detected based on the optical signal.

4. The optical fiber sensing system according to claim 3, wherein the instructions are executable by the processor to further notify an alert when the sign of breakage of the pipe has been detected.

5. The optical fiber sensing system according to claim 4, further comprising a display,
    wherein the instructions are executable by the processor to further, when the sign of breakage of the pipe has been detected, map and display the position where the sign of breakage of the pipe is detected on the display.

6. The optical fiber sensing system according to claim 1, wherein the instructions are executable by the processor to further extract vibration patterns at a plurality of locations of the pipe from the optical signal and determine a degradation state of at least one of the plurality of locations, based on the vibration patterns at the plurality of locations of the pipe.

7. Optical fiber sensing equipment comprising:
    a processor; and
    a memory storing instructions executable by the processor to:
        receive, from an optical fiber, an optical signal superimposed with vibration detected by the optical fiber that is laid in a pipe;
        extract a vibration pattern of the vibration detected by the optical fiber from the optical signal;
        change a matching pattern according to a substance flowing through the pipe;
        compare the vibration pattern of the vibration detected by the optical fiber with the changed matching pattern; and
        determine a degradation state of the pipe based on a comparison result.

8. The optical fiber sensing equipment according to claim 7, wherein the instructions are executable by the processor to further detect a sign of breakage of the pipe based on the degradation state.

9. The optical fiber sensing equipment according to claim 8, wherein the instructions are executable by the processor to further identify a position where the sign of breakage of the pipe is detected based on the optical signal.

10. The optical fiber sensing equipment according to claim 9, wherein the instructions are executable by the processor to further notify an alert when the sign of breakage of the pipe has been detected.

11. The optical fiber sensing equipment according to claim 10, further comprising a display,
wherein the instructions are executable by the processor to further, when the sign of breakage of the pipe has been detected, map and display the position where the sign of breakage of the pipe is detected on the display.

12. The optical fiber sensing equipment according to claim 7, the instructions are executable by the processor to further extract vibration patterns at a plurality of locations of the pipe from the optical signal and determine a degradation state of at least one of the plurality of locations, based on the vibration patterns at the plurality of locations of the pipe.

13. A method for detecting pipe degradation using an optical fiber sensing system, comprising:
   detecting a vibration by an optical fiber that is laid in a pipe;
   receiving, from the optical fiber, an optical signal superimposed with vibration detected by the optical fiber;
   extracting a vibration pattern of the vibration detected by the optical fiber from the optical signal;
   changing a matching pattern according to a substance flowing through the pipe;
   comparing the vibration pattern of the vibration detected by the optical fiber with the changed matching pattern; and
   determining a degradation state of the pipe based on a comparison result.

14. The method for detecting pipe degradation according to claim 13, wherein further comprising detecting a sign of breakage of the pipe based on the degradation state.

15. The method for detecting pipe degradation according to claim 14, further comprising identifying a position where the sign of breakage of the pipe is detected based on the optical signal.

16. The method for detecting pipe degradation according to claim 13, further comprising extracting vibration patterns at a plurality of locations of the pipe from the optical signal, and determining a degradation state of at least one of the plurality of locations based on the vibration patterns at the plurality of locations of the pipe.

* * * * *